US012125255B2

(12) United States Patent
Cheng et al.

(10) Patent No.: US 12,125,255 B2
(45) Date of Patent: Oct. 22, 2024

(54) POLYGON LOCALIZATION VIA A CIRCULAR-SOFTMAX BLOCK

(71) Applicants: Hewlett-Packard Development Company, L.P., Spring, TX (US); Purdue Research Foundation, West Lafayette, IN (US)

(72) Inventors: Yang Cheng, Bellevue, WA (US); Qian Lin, Half Moon Bay, CA (US); Jan Philip Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 182 days.

(21) Appl. No.: 17/821,575

(22) Filed: Aug. 23, 2022

(65) Prior Publication Data

US 2024/0071031 A1   Feb. 29, 2024

(51) Int. Cl.
  *G06V 10/20*  (2022.01)
  *G06T 15/20*  (2011.01)
  *G06V 10/75*  (2022.01)
  *G06V 10/94*  (2022.01)

(52) U.S. Cl.
  CPC .......... *G06V 10/255* (2022.01); *G06T 15/205* (2013.01); *G06V 10/753* (2022.01); *G06V 10/94* (2022.01); *G06T 2200/24* (2013.01)

(58) Field of Classification Search
  CPC .... G06V 10/255; G06V 10/753; G06V 10/94; G06V 10/48; G06V 10/82; G06T 15/205; G06T 2200/24; G06N 3/00
  See application file for complete search history.

(56) References Cited

U.S. PATENT DOCUMENTS

| | | | |
|---|---|---|---|
| 3,069,654 A | 12/1962 | Hough | |
| 11,776,673 B2 * | 10/2023 | Myers | G06V 40/20 345/633 |
| 2012/0257164 A1 | 10/2012 | Zee et al. | |

(Continued)

FOREIGN PATENT DOCUMENTS

| | | | | |
|---|---|---|---|---|
| CN | 113 920 147 A | * | 12/2021 | ............... G06N 3/08 |
| CN | 114 372 620 A | * | 12/2021 | ......... G06F 16/2228 |

OTHER PUBLICATIONS

Arlazarov, V. V., et al., "MIDV-500: A Dataset for Identity Documents Analysis and Recognition on Mobile Devices in Video Stream," Computer Optics 2019, vol. 43, Issue 5, pp. 818-824.

(Continued)

*Primary Examiner* — Said Broome
*Assistant Examiner* — Donna J. Ricks
(74) *Attorney, Agent, or Firm* — Quarles & Brady LLP

(57) ABSTRACT

An example device is described for facilitating polygon localization. In various aspects, the device can comprise a processor. In various instances, the device can comprise a non-transitory machine-readable memory that can store machine-readable instructions. In various cases, the processor can execute the machine-readable instructions, which can cause the processor to localize a polygon depicted in an image, based on execution of a deep learning pipeline. In various aspects, the deep learning pipeline can comprise a circular-softmax block.

14 Claims, 14 Drawing Sheets

(56) References Cited

U.S. PATENT DOCUMENTS

| | | | |
|---|---|---|---|
| 2020/0005469 | A1 | 1/2020 | Daniilidis et al. |
| 2020/0097757 | A1* | 3/2020 | Min ................... G06V 10/764 |
| 2020/0219262 | A1 | 7/2020 | Hsiao et al. |
| 2021/0195128 | A1* | 6/2021 | Hanada ................. H04N 23/60 |
| 2022/0405954 | A1* | 12/2022 | Ulasen ..................... G06N 3/08 |
| 2024/0045959 | A1* | 2/2024 | Marson ................ G06F 21/566 |

OTHER PUBLICATIONS

Bishop., C. M. et al., "Pattern recognition and machine learning", Springer, 2006, vol. 4. pp. 9.

Bulatov, K. et al., "Midv-2019: Challenges of the modern mobile-based document ocr," Twelfth International Conference on Machine Vision (ICMV 2019), International Society for Optics and Photonics, vol. 11433, Oct. 9, 2019, pp. 6.

Burie, J. C. et al., "ICDAR2015 Competition on Smartphone Document Capture and OCR (SmartDoc)", In 2015 13th International Conference on Document Analysis and Recognition (ICDAR), Nov. 23, 2015, pp. 1161-1165.

Canny, J., "A computational approach to edge detection," IEEE Transactions on pattern analysis and machine intelligence, No. 6, 1986, pp. 679-698.

Cheng, Y., et al., "Re-Compose the Image by Evaluating the Crop on More Than Just a Score," 2022 IEEE/CVF Winter Conference on Applications of Computer Vision (WACV), 2022, pp. 488-496.

Cheng, Y., et al., "Robust Real-Time Heart Rate Measurement from Face Videos," Electronic Imaging, vol. 2021.

Dong, X., et al., "Supervision-by-Registration: An Unsupervised Approach to Improve the Precision of Facial Landmark Detectors," In 2018 IEEE/CVF Conference on Computer Vision and Pattern Recognition, 2018, pp. 360-368.

Duda, R. O., et al., "Pattern classification and scene analysis," Wiley New York, Feb. 27, 1995, vol. 3, pp. 1-69.

Duda, R. O., et al., "Use of the hough transformation to detect lines and curves in pictures," Commun. ACM, vol. 15, No. 1, Jan. 1972, pp. 11-15.

Harris, C., et al., "A Combined Corner and Edge Detector", In Proceedings of the Alvey Vision Conference, Alvety Vision Club, 1988, pp. 147-152.

Hartley, R., et al., "Multiple View Geometry in Computer Vision," Cambridge University Press, 2 edition, 2004, pp. 1-673.

He, K., et al., "Deep residual learning for image recognition," in 2016 IEEE Conference on Computer Vision and Pattern Recognition (CVPR), 2016, pp. 770-778.

Howard, A. G., et al., "Mobilenets: Efficient convolutional neural networks for mobile vision applications," arXiv preprint arXiv:1704.04861, Apr. 17, 2017, pp. 1-10.

Howard, A., et al., "Searching for mobilenetv3," in 2019 IEEE/CVF International Conference on Computer Vision (ICCV), 2019, pp. 1314-1324.

Javed, K., et al., "Real-time document localization in natural images by recursive application of a CNN", 14th IAPR International Conference on Document Analysis and Recognition (ICDAR). Nov. 9, 2017, vol. 01, pp. 105-110.

Karatzas, D. et al., "ICDAR 2015 competition on Robust Reading," 2015 13th International Conference on Document Analysis and Recognition (ICDAR), 2015, pp. 1156-1160, doi: 10.1109/ICDAR.2015.7333942.

Kim, W.H., et al., "Document capturing method with a camera using robust feature points detection", In: 2011 International Conference on Digital Image Computing: Techniques and Applications, pp. 678-682.

Kingma, D. P., et al., "Adam: A method for stochastic optimization," Published as a conference paper at ICLR 2015, pp. 1-15.

Lampert, C.H., et al., "Oblivious document capture and real-time retrieval. In: International Workshop on Camera Based Document Analysis and Recognition", (CBDAR). vol. 8. Citeseer (2005) pp. 9.

Leal, L.R.S., et at., "Smartphone camera document detection via geodesic object proposals", In: 2016 IEEE Latin American Conference on Computational Intelligence (LA-CCI). pp. 1-6 (2016).

Lee, J. T., et al., "Semantic Line Detection and Its Applications," In 2017 IEEE International Conference on Computer Vision (ICCV), 2017, pp. 3249-3257.

Lin, T.-Y et al., "Feature pyramid networks for object detection," in 2017 IEEE Conference on Computer Vision and Pattern Recognition (CVPR), Apr. 19, 2017, pp. 936-944.

Lin, Y., et al., "Deep Hough-Transform Line Priors," In Computer Vision—ECCV 2020: 16th European Conference, Glasgow, UK, Aug. 23-28, 2020, Proceedings, Part XXII, Berlin, Heidelberg, 2020. Springer-Verlag, pp. 323-340.

Luvizon, D. C. et al., "Human Pose Regression by Combining Indirect Part Detection and Contextual Information", Computers & Graphics, vol. 85, Dec. 2019, pp. 15-22. Online available at: https://www.elsevier.com/open-access/userlicense/1.0/.

Luvizon, D. C., et al., "2D/3D Pose Estimation and Action Recognition Using Multitask Deep Learning", In 2018 IEEE/CVF Conference on Computer Vision and Pattern Recognition, Dec. 16, 2018, pp. 5137-5146, 2018.

Nibali, A. et at., "Numerical coordinate regression with convolutional neural networks", arXiv preprint arXiv:1801.07372, 2018. pp. 1-10.

Nibali, A., et al., "3D Human Pose Estimation with 2D Marginal Heatmaps," In2019 IEEE Winter Conference on Applications of Computer Vision (WACV), Jan. 7, 2019, pp. 1477-1485.

Sandler, M., et al., "Mobilenetv2: Inverted residuals and linear bottlenecks," in 2018 IEEE/CVF Conference on Computer Vision and Pattern Recognition, 2018, pp. 4510-4520.

Sheshkus, A. et al., "Neural network architecture for document image semantic segmentation," in 2020 IEEE International Conference on Image Processing (ICIP), Sep. 30, 2020, pp. 1946-1950.

Shi, J. et al., "Good features to track", In 1994 Proceedings of IEEE Conference on Computer Vision and Pattern Recognition, Jun. 21, 1994, pp. 593-600.

Simonyan, K., et al., "Very Deep Convolutional Networks for Large-Scale Image Recognition," In Yoshua Bengio and Yann LeCun, editors, 3rd International Conference on Learning Representations, ICLR 2015, San Diego, CA, USA, May 7-9, 2015, Conference Track Proceed-ings, 2015, pp. 1-14.

Sun, X., et al., "Integral Human Pose Regression," In Proceedings of the European Conference on Computer Vision (ECCV), 2018, pp. 529-545.

Wu, W., et al., "Look at Boundary: A Boundary-Aware Face Alignment Algorithm," In 2018 IEEE/CVF Conference on Computer Vision and Pattern Recognition, 2018, pp. 2129-2138.

Xiang, X., et al., "The blessing and the curse of the noise behind facial landmark annotations," Electronic Imaging, 2020, pp. 1-10.

Xie, S., et al., "Holistically-nested edge detection," in 2015 IEEE International Conference on Computer Vision (ICCV), 2015, pp. 1395-1403.

Xu, S., et al., "Emotion recognition using convolutional neural networks," Electronic Imaging, vol. 2019, No. 8, 2019, 9 pages.

Zhao, K., et al., "Deep hough transform for semantic line detection," IEEE Transactions on Pattern Analysis and Machine Intelligence (TPAMI), 2021, pp. 1-14.

Zhu, A., et al., "Coarse-to-fine document localization in natural scene image with regional attention and recursive corner refinement", Int. J. Doc. Anal. Recognition. Aug. 8, 2019, vol. 22(3), pp. 351-360.

\* cited by examiner

1100 ⟶

```
┌─────────────────────────────────────┐
│  LOCALIZING, BY A DEVICE COMPRISING A│
│  PROCESSOR, A POLYGON SHOWN IN AN IMAGE,│ ⟵ 1102
│  BASED ON EXECUTION OF A DEEP LEARNING│
│  PIPELINE THAT COMPRISES A SOFT-ARGMAX│
│  LAYER IN PARALLEL WITH A THRESHOLD- │
│       TRIGGERED ARGMAX LAYER         │
└─────────────────────────────────────┘
```

FIG. 11

POLYGON LOCALIZATION VIA A CIRCULAR-SOFTMAX BLOCK

BACKGROUND

Polygon localization can be a sub-task leveraged by computer vision apparatuses, object detection apparatuses, or document digitization apparatuses. To perform polygon localization, such apparatuses can implement a deep learning pipeline. How accurately or how inaccurately the deep learning pipeline localizes polygons can be influenced by the internal architecture of the deep learning pipeline.

BRIEF DESCRIPTION OF THE DRAWINGS

FIGS. 11-12 illustrate flow diagrams of example, non-limiting computer-implemented methods that can facilitate polygon localization via a deep learning pipeline in accordance with various examples described herein.

DETAILED DESCRIPTION

Figure 1:
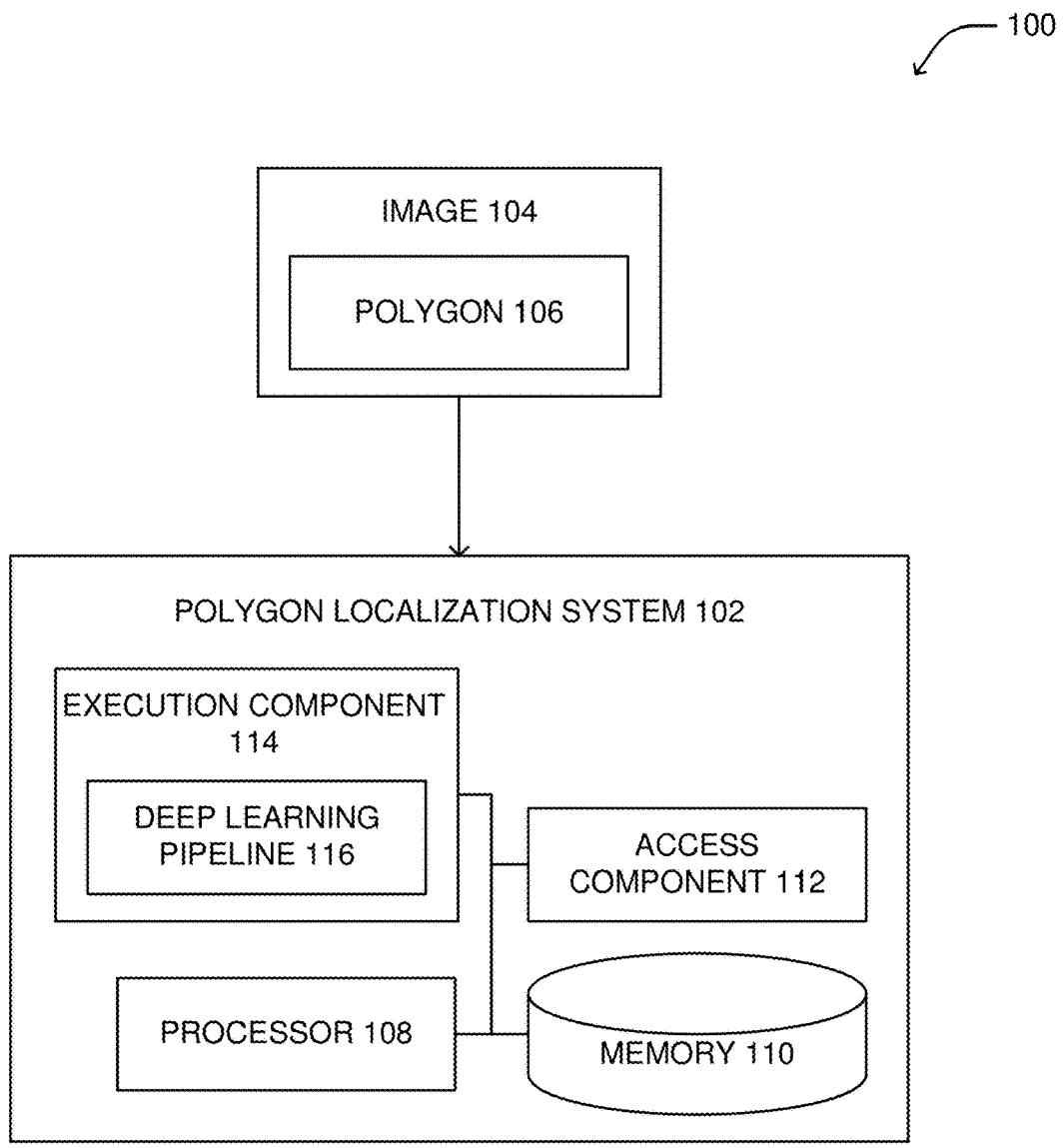
FIG. 1 illustrates a block diagram of an example, non-limiting apparatus that can facilitate polygon localization via a deep learning pipeline having a circular-softmax block in accordance with various examples described herein.

The following detailed description is merely illustrative and is not intended to limit examples or applications/uses of examples. Furthermore, there is no intention to be bound by any expressed or implied information presented in the preceding Background section or in the Detailed Description section.

Polygon localization can be considered as the computing task of determining a location of a polygon that is depicted in an image (e.g., determining where the polygon is positioned within the image). In various aspects, polygon localization can be a sub-task leveraged, utilized, or otherwise implemented by computer vision apparatuses, object detection apparatuses, or document digitization apparatuses.

As a non-limiting example, a smartphone can capture an image depicting a transaction receipt, the smart phone can localize the transaction receipt within the image (e.g., the transaction receipt can be considered as a four-sided polygon), and the smartphone can digitize the localized transaction receipt. As another non-limiting example, a classroom computing device can capture an image depicting a page of lecture notes, the classroom computing device can localize the page of lecture notes within the image (e.g., the page of lecture notes can be considered as a four-sided polygon), and the classroom computing device can digitize the localized page of lecture notes. As yet another non-limiting example, an autonomous vehicle can capture a video frame depicting a stop-sign posted along a roadway, the autonomous vehicle can localize the stop-sign within the video frame (e.g., the stop-sign can be considered as an eight-sided polygon), and the autonomous vehicle can determine when or whether to decelerate based on the localized stop-sign.

In various instances, to perform polygon localization, such computer vision apparatuses, such object detection apparatuses, or such document digitization apparatuses can implement a deep learning pipeline. In various cases, a deep learning pipeline can comprise any suitable number of any suitable types of neural network layers arranged in any suitable fashion. In various aspects, internal parameters of the neural network layers can be randomly initialized and can be iteratively updated through training.

In various instances, after undergoing training, the deep learning pipeline can be able to accurately localize polygons that are not occluded in input images. However, despite undergoing training, the deep learning pipeline can, in various cases, be unable to accurately localize polygons that are partially occluded in input images.

As a non-limiting example, suppose that the deep learning pipeline is trained to localize four-sided polygons representing documents. Moreover, suppose that the deep learning pipeline is executed on an image that depicts a transaction receipt, where some corners, edges, or other portions of the transaction receipt are hidden by other objects depicted in the image (e.g., hidden behind fingers that are holding the transaction receipt). In such case, the deep learning pipeline may be unable to accurately localize a four-sided polygon representing the transaction receipt, due to such partial occlusion.

As another non-limiting example, suppose again that the deep learning pipeline is trained to localize four-sided polygons representing documents. Furthermore, suppose that the deep learning pipeline is executed on an image that depicts a page of lecture notes, where some corners, edges, or other portions of the page of lecture notes are hidden by other objects depicted in the image (e.g., hidden behind pens, pencils, markers, whiteboard erasers, or beverage containers that are resting on top of the page of lecture notes). In such case, the deep learning pipeline may be unable to accurately localize a four-sided polygon representing the page of lecture notes, due to such partial occlusion.

As still another non-limiting example, suppose that the deep learning pipeline is trained to localize eight-sided polygons representing traffic-signs. Furthermore, suppose that the deep learning pipeline is executed on a video frame that depicts a stop-sign posted along a roadway, where some corners, edges, or other portions of the stop-sign are hidden by other objects depicted in the image (e.g., hidden behind foliage that is in front of the stop-sign). In such case, the deep learning pipeline may be unable to accurately localize an eight-sided polygon representing the stop-sign, due to such partial occlusion.

In any case, how accurately or how inaccurately the deep learning pipeline localizes polygons can be influenced by the internal architecture of the deep learning pipeline. Various examples described herein can be considered as being directed to non-limiting internal architectures that can enable a deep learning pipeline to exhibit increased polygon localization accuracy, even in the presence of partial occlusion.

More specifically, various examples described herein can be directed to computer processing devices, computer-implemented methods, apparatuses, or computer program products that can facilitate polygon localization via a circular-softmax block. In particular, various examples described herein can be directed to execution or training of a deep learning pipeline, where the internal architecture of the deep learning pipeline can include a circular-softmax block. In various aspects, the circular-softmax block can comprise a soft-argmax layer in series with a circular-mean layer. In various instances, the soft-argmax layer can apply a soft-argmax function (also referred to as a soft-argmax operator) to a set of Hough heatmaps generated by a preceding portion of the deep learning pipeline. In various cases, application of the soft-argmax function can cause the set of Hough heatmaps to become normalized. In various aspects, the circular-mean layer can apply a circular-mean function (also referred to as a circular-mean operator) to the set of normalized Hough heatmaps. In various instances, application of the circular-mean function can yield polygon localization results (e.g., can reveal the locations of edges of a polygon depicted in an image that is fed as input to the deep learning pipeline).

Furthermore, in various cases, the circular-mean layer can be threshold-triggered. In particular, the circular-mean layer can apply the circular-mean function to the set of normalized Hough heatmaps, in response to a determination that a variance of the set of normalized Hough heatmaps is below a threshold. In contrast, the circular-mean layer can, in various aspects, refrain from applying the circular-mean function to the set of normalized Hough heatmaps, in response to a determination that the variance is not below the threshold. Instead, in response to a determination that the variance is not below the threshold, an argmax layer in parallel with the circular-softmax block can apply an argmax function (also referred to as an argmax operator) to the set of Hough heatmaps (e.g., to the non-normalized set of Hough heatmaps). In various instances, application of the argmax function to the set of Hough heatmaps can yield the polygon localization results.

Various experiments have demonstrated increased polygon localization accuracy even in the presence of partial polygon occlusion, when various examples described herein are implemented. In other words, a deep learning pipeline can more accurately localize partially occluded polygons, when the deep learning pipeline is outfitted with a circular-softmax block as described herein.

In various aspects, some examples described herein can be considered as a computerized tool (e.g., any suitable combination of computer-executable hardware or machine-readable instructions) that can facilitate polygon localization via a circular-softmax block. In various instances, such computerized tool can comprise an access component, an execution component, or a graphical user-interface component.

In various aspects, there can be an image. In various instances, the image can be any suitable two-dimensional array of pixels. In various cases, the image can be a frame belonging to a video (e.g., belonging to a sequence of video frames). In various aspects, the image can be generated by any suitable imaging device (e.g., smartphone camera, laptop camera, web camera, security camera, autonomous vehicle camera).

In any case, the image can depict, show, or otherwise visually illustrate a polygon. In various instances, the polygon can be any suitable two-dimensional shape made up of any suitable number of line segments (e.g., made up of any suitable number of straight edges). That is, the polygon can be considered as having m edges, for any suitable positive integer m≥3. As a non-limiting example, the polygon can be a quadrilateral (e.g., m=4) representing a document page that is depicted in the image. As another non-limiting example, the polygon can be a quadrilateral (e.g., m=4) representing a whiteboard or a chalkboard that is depicted in the image. As yet another non-limiting example, the polygon can be a quadrilateral (e.g., m=4) representing an electronic monitor/screen that is depicted in the image. As still another non-limiting example, the polygon can be an octagon (e.g., m=8) representing a stop-sign that is depicted in the image. In various aspects, the polygon can be depicted in the image according to any suitable perspective or orientation.

In various aspects, the access component of the computerized tool can electronically receive or otherwise access the image. In some instances, the access component can retrieve the image from any suitable centralized or decentralized data structure (e.g., graph data structure, relational data structure, hybrid data structure), whether remote from or local to the access component. In other instances, the access component can retrieve the image from whichever imaging device generated or captured the image. In any case, the access component can electronically obtain or access the image, such that other components of the computerized tool can electronically interact with (e.g., read, write, edit, copy, manipulate) the image.

In various aspects, the execution component of the computerized tool can electronically store, maintain, control, or otherwise access a deep learning pipeline. In various instances, the deep learning pipeline can be structured, trained, or otherwise designed to perform polygon localization on inputted images. Accordingly, in various cases, the execution component can execute the deep learning pipeline on the image, and such execution can cause the deep learning pipeline to produce a set of edge parameter tuples corresponding to the polygon depicted in the image. In various aspects, each edge parameter tuple can be any suitable number of scalars, any suitable number of vectors, any suitable number of matrices, any suitable number of tensors, or any suitable combination thereof, such that the edge parameter tuple indicates or conveys the location of a respective edge of the polygon (e.g., indicates/conveys where the respective edge of the polygon is located or oriented within the image). Accordingly, since the polygon can have m edges, the set of edge parameter tuples can include m tuples (e.g., a tuple per edge).

More specifically, the deep learning pipeline can, in various aspects, comprise a backbone network, a Hough layer, a heatmap block, a circular-softmax block, or an argmax layer. In various instances, the backbone network, the Hough layer, or the heatmap block can be in series with each other. In various cases, the Hough layer can be downstream from the backbone network. In various instances, the heatmap block can be downstream from the Hough layer. In various aspects, the circular-softmax block and the argmax layer can both be downstream from the heatmap block.

Moreover, in various instances, the circular-softmax block and the argmax layer can be in parallel with each other.

In various cases, the backbone network can exhibit any suitable deep learning architecture. For example, the backbone network can include any suitable numbers of any suitable types of neural network layers (e.g., an input layer, a set of hidden layers, an output layer, any of which can be convolutional layers, dense layers, batch normalization layers, padding layers, or pooling layers). As another example, the backbone network can include any suitable numbers of neurons in various layers (e.g., different layers can have the same or different numbers of neurons as each other). As yet another example, the backbone network can include any suitable activation functions (e.g., sigmoid, softmax, hyperbolic tangent, rectified linear unit) or any suitable learnable parameters (e.g., weights, biases, convolutional kernels) in various neurons (e.g., different neurons can have the same or different activation functions or learnable parameters as each other). As still another example, the backbone network can include any suitable interneuron connections (e.g., forward connections, skip connections, recurrent connections).

In various aspects, the execution component can feed the image to the backbone network, which can cause the backbone network to produce some outputs. In various instances, such outputs can be referred to as a set of Cartesian-space features associated with the image. More specifically, an input layer of the backbone network can receive the image, the image can complete a forward pass through any suitable number of hidden layers of the backbone network, and an output layer of the backbone network can compute the set of Cartesian-space features based on activations yielded by the hidden layers. In various cases, the set of Cartesian-space features can include any suitable number of Cartesian-space features. In various aspects, each Cartesian-space feature can be any suitable number of scalars, any suitable number of vectors, any suitable number of matrices, any suitable number of tensors, or any suitable combination thereof.

In various instances, the execution component can feed the set of Cartesian-space features to the Hough layer. In various cases, the Hough layer can apply a Hough transform to each of the set of Cartesian-space features, thereby yielding a set of Hough-space features. Accordingly, each of the set of Hough-space features can be considered as a Hough-transformed-version of a respective one of the set of Cartesian-space features. That is, the set of Hough-space features can, in various aspects, have the same cardinality as the set of Cartesian-space features, where each Hough-space feature can be any suitable number of scalars, any suitable number of vectors, any suitable number of matrices, any suitable number of tensors, or any suitable combination thereof.

In various aspects, the execution component can feed the set of Hough-space features to the heatmap block. In various instances, this can cause the heatmap block to produce as output a set of Hough heatmaps. In various cases, the set of Hough heatmaps can respectively correspond to the edges of the polygon. That is, since the polygon can have m edges, the set of Hough heatmaps can include m heatmaps (e.g., a Hough heatmap per edge). In various aspects, each Hough heatmap can be any suitable number of scalars, any suitable number of vectors, any suitable number of matrices, any suitable number of tensors, or any suitable combination thereof.

More specifically, the heatmap block can include a padding layer, a first convolutional layer, a batch normalization layer, a rectified linear unit layer, a bilinear interpolation layer, a concatenation layer, or a second convolutional layer.

In various aspects, the first convolutional layer can be downstream from the padding layer, the batch normalization layer can be downstream from the first convolutional layer, the rectified linear unit layer can be downstream from the batch normalization layer, the bilinear interpolation layer can be downstream from the rectified linear unit layer, the concatenation layer can be downstream from the bilinear interpolation layer, and the second convolutional layer can be downstream from the concatenation layer.

In various aspects, the execution component can feed the set of Hough-space features to the padding layer. In various aspects, the padding layer can apply any suitable padding to each of the set of Hough-space features (e.g., zero padding or circular padding), thereby yielding a set of padded features.

In various instances, the execution component can feed the set of padded features to the first convolutional layer. In various cases, the first convolutional layer can convolve each of the set of padded features via any suitable convolutional kernel, thereby yielding a set of convolved features.

In various aspects, the execution component can feed the set of convolved features to the batch normalization layer. In various instances, the batch normalization layer can apply any suitable batch normalization technique to each of the set of convolved features, thereby yielding a set of batch-normalized features.

In various cases, the execution component can feed the set of batch-normalized features to the rectified linear unit layer. In various aspects, the rectified linear unit layer can apply a rectified linear unit (ReLU) function (or any other suitable activation function) to each of the set of batch-normalized features, thereby yielding a set of ReLU-transformed features.

In various instances, the execution component can feed the set of ReLU-transformed features to the bilinear interpolation layer. In various cases, the bilinear interpolation layer can apply bilinear interpolation (or any other suitable up-sampling technique) to each of the set of ReLU-transformed features, thereby yielding a set of up-sampled features.

In various aspects, the execution component can feed the set of up-sampled features to the concatenation layer. In various instances, the concatenation layer can concatenate the set of up-sampled features together, thereby yielding a concatenation.

In various cases, the execution component can feed the concatenation to the second convolutional layer. In various aspects, the second convolutional layer can convolve the concatenation via any suitable convolutional kernel. In various instances, the results of such convolution can be considered or otherwise referred to as the set of Hough heatmaps.

In some cases, the padding layer, the first convolutional layer, the batch normalization layer, and the rectified linear unit layer can be collectively considered as forming a convolutional block, and such convolutional block can be sequentially repeated any suitable number of times within the heatmap block. That is, the heatmap block can comprise a chain of any suitable number of convolutional blocks that are in series with each other, where each of such convolutional blocks can include a padding layer, a convolutional layer, a batch normalization layer, or a rectified linear unit layer. In such case, the bilinear interpolation layer, the concatenation layer, and the second convolutional layer can be downstream of the last of such chain of convolutional blocks.

In any case, the set of Hough heatmaps can respectively correspond to the edges of the polygon. In other words, since the polygon can have m edges, the set of Hough heatmaps can have m Hough heatmaps. In various aspects, a Hough heatmap can be any suitable number of scalars, any suitable number of vectors, any suitable number of matrices, any suitable number of tensors, or any suitable combination thereof. In various instances, a Hough heatmap can be considered as containing encoded information representing the location or orientation of a respective edge of the polygon. In various cases, such encoded information can be extracted by the circular-softmax block or by the argmax layer, as described herein.

In various aspects, the circular-softmax block can include a soft-argmax layer, a variance check, or a circular-mean layer. In various instances, the variance check can be downstream from the soft-argmax layer. In various aspects, the circular-mean layer can be downstream from the variance check. In various cases, the variance check can control (e.g., activate or deactivate) the circular-mean layer or the argmax layer.

In various aspects, the execution component can feed the set of Hough heatmaps to the soft-argmax layer. In various instances, the soft-argmax layer can apply the soft-argmax function to each of the set of Hough heatmaps. In various cases, because the soft-argmax function can be considered as causing a normalizing effect, application of the soft-argmax function to each of the set of Hough-heatmaps can yield a set of normalized Hough heatmaps.

In various cases, the execution component can feed the set of normalized Hough heatmaps to the variance check. In various aspects, the variance check can be any suitable neural network layer that can compute a variance of the set of Hough heatmaps. In various instances, the variance check can compare the computed variance to any suitable threshold value. If the computed variance is below the threshold value, the variance check can activate the circular-mean layer and can deactivate the argmax layer. In contrast, if the computed variance is above the threshold value, the variance check can deactivate the circular-mean layer and can activate the argmax layer.

In various aspects, if the circular-mean layer is activated or the argmax layer is deactivated, then the execution component can feed the set of normalized Hough heatmaps to the circular-mean layer. In various instances, the circular-mean layer can apply the circular-mean function to each of the set of normalized Hough heatmaps, thereby yielding the set of edge parameter tuples. In other words, application of the circular-mean function to any given normalized Hough heatmap can reveal the location or orientation of a respective edge of the polygon depicted in the image. Because the argmax layer can be deactivated in this scenario, the argmax layer can refrain from taking action.

In various aspects, if the circular-mean layer is deactivated or the argmax layer is activated, then the execution component can feed the set of Hough heatmaps (e.g., the non-normalized set of Hough heatmaps) to the argmax layer. In various instances, the argmax layer can apply the argmax function to each of the set of Hough heatmaps, thereby yielding the set of edge parameter tuples. In other words, application of the argmax function to any given Hough heatmap (e.g., to any given non-normalized Hough heatmap) can reveal the location or orientation of a respective edge of the polygon depicted in the image. Because the circular-mean layer can be deactivated in this scenario, the circular-mean layer can refrain from taking action.

Accordingly, if a variance of the set of normalized Hough heatmaps is considered as not being excessively high (e.g., is below the threshold), then the set of edge parameter tuples can be obtained via the circular-mean layer. On the other hand, if a variance of the set of normalized Hough heatmaps is considered as being excessively high (e.g., is above the threshold), then the set of edge parameter tuples can be obtained via the argmax layer. In any case, the set of edge parameter tuples can be obtained, and such edge parameter tuples can be considered as respectively indicating or conveying where the edges of the polygon are located within the image.

Note that, because the argmax layer can be activated or deactivated based on the whether the variance of the set of normalized Hough heatmaps is above or below the threshold value, the argmax layer can be considered as being threshold-triggered or threshold-controlled. Similarly, because the circular-mean layer can be activated or deactivated based on the whether the variance of the set of normalized Hough heatmaps is above or below the threshold value, the circular-mean layer can likewise be considered as being threshold-triggered or threshold-controlled.

In various aspects, the graphical user-interface component of the computerized tool can initiate any suitable electronic actions based on the set of edge parameter tuples. As a non-limiting example, the graphical user-interface component can electronically render, on any suitable computer screen, display, or monitor, the set of edge parameter tuples. As another non-limiting example, since the set of edge parameter tuples can indicate where the edges of the polygon are located within the image, the graphical user-interface component can electronically render, on any suitable computer screen, display, or monitor, the image with visual emphasis (e.g., highlighting) applied to the edges of the polygon. In this way, a technician associated with the computerized tool can be apprised of the polygon localization results produced by the deep learning pipeline.

To help ensure that the set of edge parameter tuples produced by the deep learning pipeline is accurate, the deep learning pipeline can first undergo training. In various aspects, the deep learning pipeline can undergo any suitable type, style, or paradigm of training. For example, the deep learning pipeline can undergo supervised training based on an annotated training dataset, where the annotated training dataset can include training images (e.g., each training image depicting an m-sided polygon) and ground-truth edge parameter tuples for each training image. In such case, the internal parameters of the deep learning pipeline (e.g., the weights, biases, or convolutional kernels of the backbone network; the weights, biases, or convolutional kernels of the heatmap block) can be randomly initialized.

In various aspects, a training image and a set of ground-truth edge parameter tuples corresponding to that training image can be selected from the annotated training dataset. In various instances, the selected training image can be fed as input to the deep learning pipeline, the selected training image can complete a forward pass through the deep learning pipeline (e.g., through the backbone network, the Hough layer, the heatmap block, the argmax layer, and the circular-softmax block), and the deep learning pipeline can produce some output based on the selected training image. In various cases, the output can be considered as the predicted edge parameter tuples which the deep learning pipeline infers should correspond to the selected training image. In contrast, the selected set of ground-truth edge parameter tuples can be considered as the correct edge parameter tuples that are known or deemed to correspond to the selected training image. Note that, if the deep learning pipeline has so far undergone no or little training, then the output can be highly inaccurate (e.g., the output can be very different from the selected set of ground-truth edge parameter tuples).

In any case, an error or loss (e.g., cross-entropy) can be computed between the output and the selected set of ground-truth edge parameter tuples, and the internal parameters of the deep learning pipeline can be updated by performing backpropagation (e.g., stochastic gradient descent) driven by such computed error/loss. Note that, in various instances, such backpropagation can affect the backbone network and the heatmap block, since the backbone network and the heatmap block can contain learnable internal parameters (e.g., weights, biases, convolutional kernels). In contrast, such backpropagation can, in various cases, refrain from affecting the Hough layer, the argmax layer, and the circular-softmax block, since the Hough layer, the argmax layer, and the circular-softmax block can lack learnable internal parameters (e.g., application of the Hough transform might not rely upon learnable parameters; application of the argmax function might not rely upon learnable parameters; application of the soft-argmax function might not rely upon learnable parameters; application of the circular-mean function might not rely upon learnable parameters).

In various aspects, such training procedure can be repeated for each training image in the annotated training dataset, with the result being that the internal parameters (e.g., weights, biases, convolutional kernels) of the deep learning pipeline can achieve post-training values that help to enable accurate localization of m-sided polygons depicted/illustrated in inputted images. In various instances, any suitable training batch sizes, any suitable training termination criteria, or any suitable error/loss functions can be implemented during such training.

Although the above example focuses on supervised training, this is a mere non-limiting example for ease of explanation. In various other examples, the deep learning pipeline can undergo or have undergone unsupervised training based on an unannotated training dataset or reinforcement training based on iterative rewards/penalties. In various instances, the computerized tool described herein can perform any of such training on the deep learning pipeline.

No matter which type or paradigm of training the deep learning pipeline undergoes, such training can help the deep learning pipeline (e.g., can help the backbone network and the heatmap block) to accurately encode location information of the edges of the polygon into the set of Hough heatmaps. As mentioned above, such encoded location information can be extracted from the set of Hough heatmaps by the argmax layer or by the circular-softmax block. Various experimental results have shown that implementation of the circular-softmax block as described herein can cause more accurate extraction of such encoded location information, as compared to implementation of the argmax layer by itself.

More specifically, extracting the encoded location information from the set of Hough heatmaps via application of the argmax function alone can cause the set of edge parameter tuples to be corrupted by a quantization error. Indeed, various experimental results have shown that such quantization error can increase in the presence of partial occlusion. Unlike the argmax function, the soft-argmax function and the circular-mean function can, in various aspects, refrain from causing such quantization error. Thus, extracting the encoded location information from the set of Hough heatmaps via application of the soft-argmax function and the circular-mean function can, in some instances, cause the set of edge parameter tuples to be more accurate, especially when partial polygon occlusion is involved.

Despite such lack of quantization error, however, application of the soft-argmax function can, in certain instances, introduce an unreliability error into the set of edge parameter tuples. Fortunately, such unreliability error can, in various aspects, be detected based on a variance of the set of normalized Hough heatmaps. In other words, if the variance of the set of normalized Hough heatmaps is below any suitable threshold value, then it can be concluded that application of the soft-argmax function has introduced no more than negligible amounts of unreliability error. In such case, the set of edge parameter tuples can be obtained by applying the circular-mean function to the set of normalized Hough heatmaps. On the other hand, if the variance of the set of normalized Hough heatmaps is above any suitable threshold value, then it can be concluded that application of the soft-argmax function has introduced some non-negligible amounts of unreliability error. In such case, the set of edge parameter tuples can be obtained by applying the argmax function to the set of Hough heatmaps.

By implementing the circular-softmax block as described herein, the set of edge parameter tuples can, in various aspects, be protected from both the quantization error and the unreliability error. In particular, if the deep learning pipeline did not have the circular-softmax block, then the set of edge parameter tuples would be obtained via the argmax layer alone, which would introduce quantization error. In contrast, when the circular-softmax block is implemented as described herein, the set of edge parameter tuples can be obtained via the soft-argmax layer and the circular-mean layer when the variance of the set of normalized Hough heatmaps is below the threshold value. In such case, the low magnitude of the variance can indicate the presence of at most negligible levels of unreliability error caused by the soft-argmax layer. Furthermore, because the argmax layer can be bypassed in such case, the quantization error can be avoided. Thus, the circular-softmax block can, in various instances, be considered as safeguarding the set of edge parameter tuples from both quantization error and unreliability error.

Various examples described herein can be employed to use computerized hardware or machine-readable instructions to perform functionalities that are highly technical in nature (e.g., to facilitate polygon localization via a circular-softmax block), that are not abstract and that cannot be performed as a set of mental acts by a human. Further, some of the processes performed can be performed by a specialized computer (e.g., a deep learning pipeline having internal parameters such as weight matrices, bias values, or convolutional kernels) for carrying out defined tasks related to polygon localization. For example, such defined tasks can include: localizing a polygon depicted in an image, based on execution of a deep learning pipeline that comprises a circular-softmax block; and rendering, on a graphical user-interface, the image with visual emphasis on localized edges of the polygon. In various aspects, a portion of the deep learning pipeline that precedes the circular-softmax block can receive the image as input and can produce a set of Hough heatmaps as output. In various instances, the deep learning pipeline can include an argmax layer that is in parallel with the circular-softmax block, and the circular-softmax block can apply a soft-argmax function to the set of Hough heatmaps to yield a set of normalized Hough heatmaps. In various cases, if a variance of the set of normalized Hough heatmaps is above a threshold, the argmax layer can apply an argmax function to the set of Hough heatmaps to yield edge parameters of the polygon. In contrast, if the variance of the set of normalized Hough heatmaps is below the threshold, the circular-softmax block can apply a circular-mean function to the set of normalized Hough heatmaps to yield the edge parameters of the polygon.

Such defined tasks are not performed manually by humans. Indeed, neither the human mind nor a human with pen and paper can electronically access an image depicting a polygon and can electronically execute a deep learning pipeline on the image so as to localize the polygon, where the deep learning pipeline can include a threshold-triggered argmax layer in parallel with a circular-softmax block. Instead, various examples described herein are inherently and inextricably tied to computer technology and cannot be implemented outside of a computing environment. Indeed, a deep learning pipeline that can perform polygon localization and that can be outfitted with a circular-softmax block is an inherently-computerized construct that cannot be implemented in any way by the human mind without computers. Accordingly, a computerized tool that can train or execute such a deep learning pipeline on inputted images is likewise inherently-computerized and cannot be implemented in any sensible, practical, or reasonable way without computers.

Moreover, various examples described herein can integrate into a practical application various teachings relating to polygon localization via a circular-softmax block. As explained above, if a deep learning pipeline extracts edge parameter tuples from Hough heatmaps using an argmax function alone, such extracted edge parameter tuples can be tainted by quantization error, especially in the presence of partial polygon occlusion. In stark contrast, if a deep learning pipeline extracts edge parameter tuples from Hough heatmaps using a circular-softmax block as described herein, such extracted edge parameter tuples can, in various instances, be protected from such quantization error. Such lack of quantization error can result in more accurate polygon localization, even in the presence of partial polygon occlusion. Accordingly, various examples described herein constitute a useful and practical application of computers.

Furthermore, various examples described herein can control real-world tangible devices based on the disclosed teachings. For example, various examples described herein can electronically access a real-world image, can electronically execute a real-world deep learning pipeline on such real-world image so as to localize a polygon depicted in the real-world image, and can electronically render, on a real-world computer screen, localized edges of the polygon with visual emphasis or highlighting.

It should be appreciated that the herein figures and description provide non-limiting examples and are not necessarily drawn to scale.

FIG. 1 illustrates a block diagram of an example, non-limiting apparatus 100 that can facilitate polygon localization via a deep learning pipeline having a circular-softmax block in accordance with various examples described herein. As shown, a polygon localization system 102 can be electronically integrated, via any suitable wired or wireless electronic connection, with an image 104.

In various aspects, the image 104 can be an H-by-W array of pixels, for any suitable positive integers H and W. In various instances, the image 104 can be generated or captured by any suitable imaging device (not shown). As a non-limiting example, the image 104 can be generated or captured by a camera of smartphone. As another non-limiting example, the image 104 can be generated or captured by a camera of laptop computer or of a desktop computer. As yet another non-limiting example, the image 104 can be generated or captured by a security camera. As still another non-limiting example, the image 104 can be generated or captured by a traffic camera. As even another non-limiting example, the image 104 can be generated or captured by a camera of an autonomous vehicle (e.g., an autonomous car, an autonomous aircraft, an autonomous watercraft).

In any case, various pixels of the image 104 can visually depict, show, or otherwise illustrate a polygon 106. In various aspects, the polygon 106 can have m straight-line edges, for any suitable positive integer $m \geq 3$. Moreover, in various instances, the polygon 106 can represent any suitable object or item. As a non-limiting example, the polygon 106 can represent a four-sided (e.g., m=4) object/item that is depicted, shown, or otherwise illustrated in the image 104, such as a document (e.g., a piece of paper with text or drawings thereon, a textbook page, a textbook cover, a poster, a transaction receipt). As another non-limiting example, the polygon 106 can represent an eight-sided (e.g., m=8) object/item that is depicted, shown, or otherwise illustrated in the image 104, such as a traffic stop-sign posted along a roadway.

In any case, the polygon 106 can be made up of m edges, and the polygon localization system 102 can localize the polygon 106, as described herein.

In various aspects, the polygon localization system 102 can comprise a processor 108 (e.g., computer processing unit, microprocessor) and a non-transitory computer-readable memory 110 that can be operably or operatively or communicatively connected/coupled to the processor 108. Non-limiting examples of the non-transitory computer-readable memory 110 can include a scratchpad memory, a random access memory ("RAM"), a cache memory, a non-volatile random-access memory ("NVRAM"), or any suitable combination thereof. The non-transitory computer-readable memory 110 can store machine-readable instructions which, upon execution by the processor 108, can cause the processor 108 or other components of the polygon localization system 102 (e.g., access component 112, execution component 114) to perform any suitable number of acts. In various examples, the non-transitory computer-readable memory 110 can store computer-executable components (e.g., access component 112, execution component 114), and the processor 108 can execute the computer-executable components.

In various aspects, the polygon localization system 102 can comprise an access component 112. In various instances, the access component 112 can electronically receive or otherwise electronically access the image 104. For example, the access component 112 can electronically retrieve the image 104 from any suitable centralized or decentralized data structure (not shown) that stores or otherwise maintains the image 104. As another example, the access component 112 can electronically retrieve the image 104 from the imaging device that generated or captured the image 104. In any case, the access component 112 can electronically obtain or access the image 104, so that other components of the polygon localization system 102 can electronically interact with the image 104.

In various aspects, the polygon localization system 102 can comprise an execution component 114. In various instances, the execution component 114 can electronically store, electronically maintain, electronically control, or otherwise electronically access a deep learning pipeline 116. In various cases, as described herein, the deep learning pipeline 116 can comprise a circular-softmax block, and the execution component 114 can localize the polygon 106 by executing the deep learning pipeline 116 on the image 104.

Figure 2:
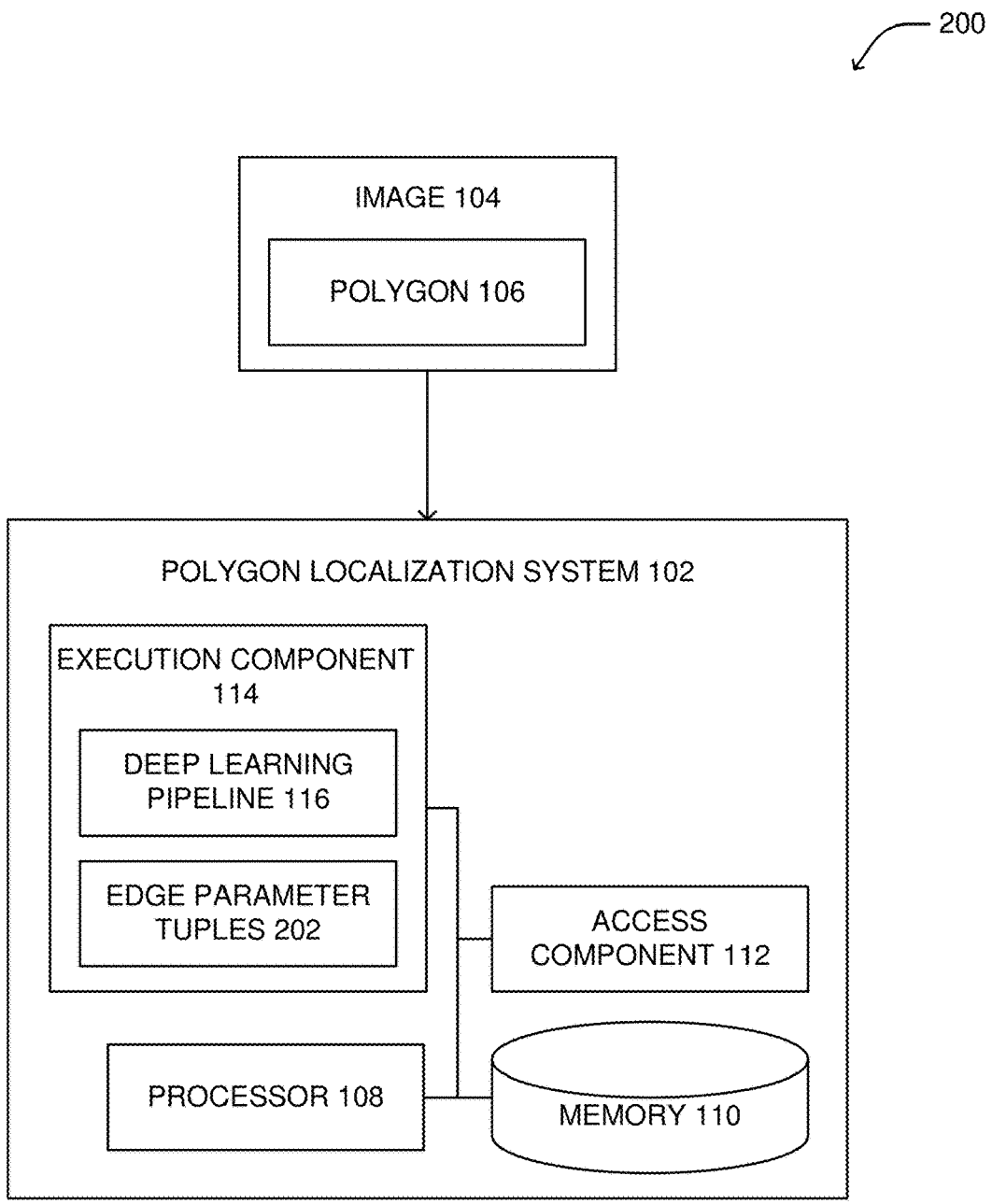
FIG. 2 illustrates a block diagram of an example, non-limiting apparatus including edge parameter tuples that can facilitate polygon localization via a deep learning pipeline having a circular-softmax block in accordance with various examples described herein.

FIG. 2 illustrates a block diagram of an example, non-limiting apparatus 200 including edge parameter tuples that can facilitate polygon localization via a deep learning pipeline having a circular-softmax block in accordance with various examples described herein. As shown, the apparatus 200 can, in some cases, comprise the same components as the apparatus 100, and can further comprise a set of edge parameter tuples 202.

In various aspects, the execution component 114 can generate the set of edge parameter tuples 202 by executing the deep learning pipeline 116 on the image 104. In various instances, the set of edge parameter tuples 202 can be considered as indicating where each edge of the polygon 106 is located within the image 104. Accordingly, the set of edge parameter tuples 202 can be considered as localization results pertaining to the polygon 106. Various non-limiting aspects regarding how the set of edge parameter tuples 202 can be generated are described with respect to FIGS. 3-5.

Figure 3:
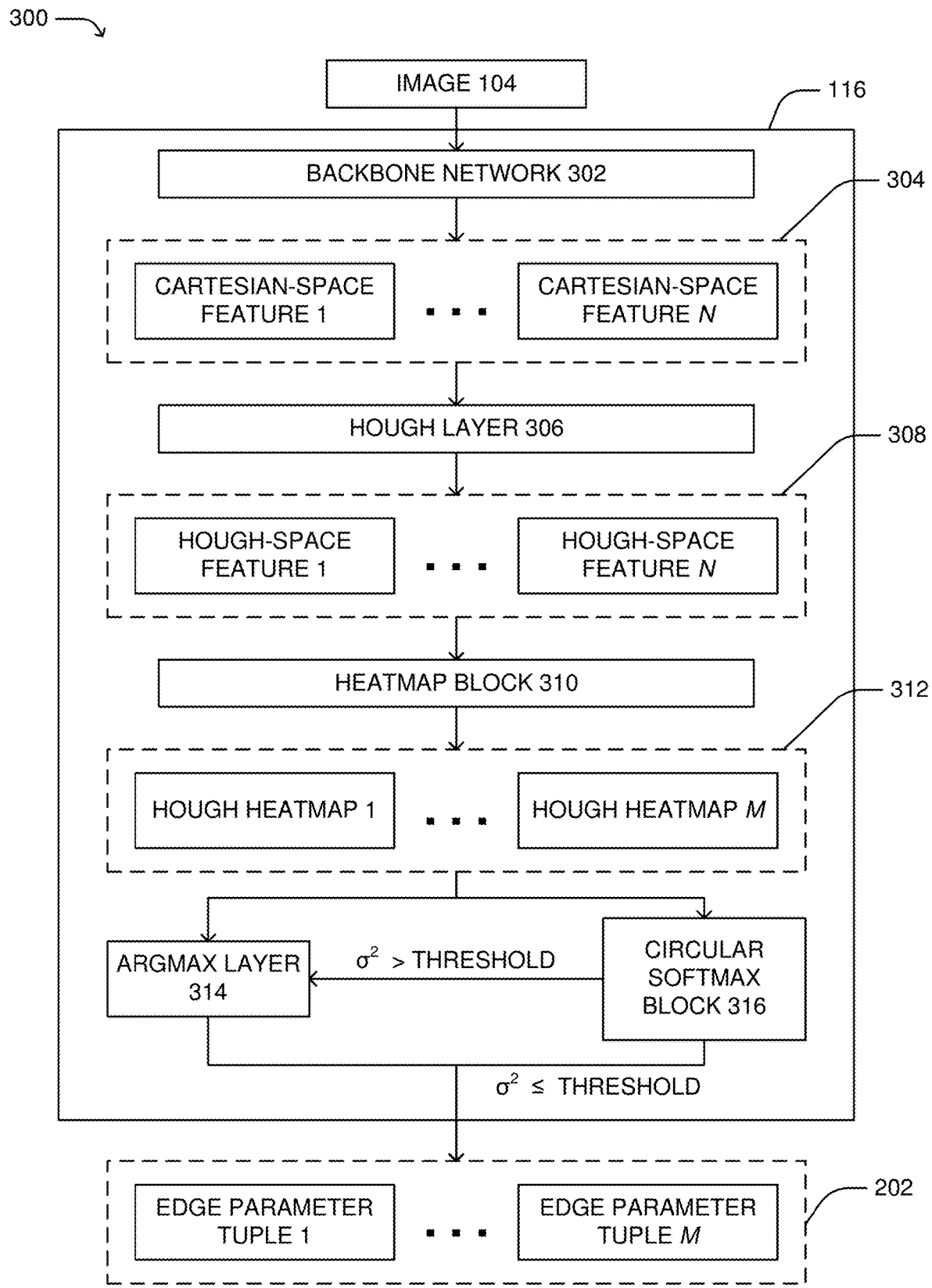
FIG. 3 illustrates an example, non-limiting block diagram of a deep learning pipeline having a circular-softmax block in accordance with various examples described herein.

FIG. 3 illustrates an example, non-limiting block diagram 300 of a deep learning pipeline having a circular-softmax block in accordance with various examples described herein. In other words, FIG. 3 shows a non-limiting example of the deep learning pipeline 116.

In various aspects, as shown, the deep learning pipeline 116 can comprise a backbone network 302, a Hough layer 306, a heatmap block 310, an argmax layer 314, or a circular-softmax block 316. In various instances, the backbone network 302 can be positioned at an up-stream end of the deep learning pipeline 116. In various cases, the Hough layer 306 can follow the backbone network 302; that is, the Hough layer 306 can be downstream of the backbone network 302. In various aspects, the heatmap block 310 can follow the Hough layer 306; that is, the heatmap block 310 can be downstream of the Hough layer 306. In various instances, the argmax layer 314 and the circular-softmax block 316 can both follow the heatmap block 310; that is, both the argmax layer 314 and the circular-softmax block 316 can be positioned downstream of the heatmap block 310. In various cases, as shown, the argmax layer 314 and the circular-softmax block 316 can be in parallel with each other. Accordingly, the argmax layer 314 and the circular-softmax block 316 can, in various aspects, be considered as collectively being positioned at a downstream-end of the deep learning pipeline 116.

In various aspects, the backbone network 302 can exhibit any suitable deep learning neural network architecture. In particular, the backbone network 302 can have any suitable numbers of any suitable types of neural network layers arranged in any suitable fashion or order. For example, the backbone network 302 can have an input layer, followed by any suitable number of hidden layers, followed by an output layer. In various instances, any layers within the backbone network 302 can have any suitable types of learnable/trainable parameters. For example, any of the input layer, the any suitable number of hidden layers, or the output layer can be dense neural network layers (e.g., whose learnable/trainable parameters can be weight matrices or bias values), can be convolutional neural network layers (e.g., whose learnable/trainable parameters can be convolutional kernels), or can be batch normalization layers (e.g., whose learnable/trainable parameters can be scale or shift factors). Relatedly, in various cases, any layers within the backbone network 302 can be structured without learnable/trainable parameters. For example, any of the input layer, the any suitable number of hidden layers, or the output layer can be pooling layers, up-sampling layers, down-sampling layers, padding layers, or concatenation layers. In various aspects, any suitable activation functions (e.g., sigmoid, softmax, hyperbolic tangent, rectified linear unit) can be implemented in any suitable neurons of the backbone network 302. In various instances, any suitable interneuron connections (e.g., forward connections, skip connections, recurrent connections) can be implemented in the backbone network 302.

As some specific non-limiting examples, the backbone network 302 can be a Visual Geometry Group Neural Network (VGG), a Residual Neural Network (ResNet), a Mobile Vision Application Neural Network (MobileNet), a Feature Pyramid Network (FPN), or any suitable combination thereof. For instance, the backbone network 302 can, in some cases, comprise a MobileNet combined with an FPN.

Regardless of the architecture of the backbone network 302, the execution component 114 can, in various aspects, electronically provide the image 104 as input to the backbone network 302, and the backbone network 302 can produce an output based on the image 104. In various instances, such output can be referred to as a set of Cartesian-space features 304. More specifically, the input layer of the backbone network 302 can receive the image 104, the image 104 can complete a forward pass through the hidden layers of the backbone network 302, and the output layer of the backbone network 302 can compute the set of Cartesian-space features 304 using activation maps provided by the hidden layers of the backbone network 302.

In various aspects, as shown, the set of Cartesian-space features 304 can have n features for any suitable positive integer n: a Cartesian-space feature 1 to a Cartesian-space feature n. In some instances, n can be equal to m. However, in other instances, n can be unequal to m. In any case, each of the set of Cartesian-space features 304 can be considered as containing encoded information gleaned by the backbone network 302 from the image 104, and each of the set of Cartesian-space features 304 can exhibit any suitable format, size, or dimensionality. For example, the Cartesian-space feature 1 can be any suitable number of scalars, any suitable number of vectors, any suitable number of matrices, or any suitable number of tensors. Likewise, the Cartesian-space feature m can be any suitable number of scalars, any suitable number of vectors, any suitable number of matrices, or any suitable number of tensors. In various aspects, different ones of the set of Cartesian-space features 304 can have the same or different formats, sizes, or dimensionalities as each other.

In various instances, the execution component 114 can provide the set of Cartesian-space features 304 to the Hough layer 306. In various cases, the Hough layer 306 can be any suitable neural network layer that can apply a Hough transform to each of the set of Cartesian-space features 304. In various aspects, application of the Hough transform to the set of Cartesian-space features 304 can yield as output a set of Hough-space features 308. In various instances, as shown, the set of Hough-space features 308 can respectively correspond (e.g., in one-to-one fashion) to the set of Cartesian-space features 304. Accordingly, since the set of Cartesian-space features 304 can include n features, the set of Hough-space features 308 can likewise include n features: a Hough-space feature 1 to a Hough-space feature n. More specifically, each of the set of Hough-space features 308 can be obtained by applying the Hough transform to a respective one of the set of Cartesian-space features 304. For example, the Hough-space feature 1 can be considered as the result obtained by applying the Hough transform to the Cartesian-space feature 1. Likewise, the Hough-space feature n can be considered as the result obtained by applying the Hough transform to the Cartesian-space feature n.

In various aspects, any given line depicted in the image 104 can be parameterized by two parameters: r and θ. In various instances, r can be the shortest distance between an origin of the image 104 and the given line, and θ can be the angle (e.g., measured in radians) between an x-axis of the image 104 and a line segment that passes through that shortest distance (e.g., such line segment can be referred to as the normal of the given line). With such parameterization, the Cartesian coordinates (x, y) of any point on the given line can be obtained via the following equation:

$$r = x \cos \theta + y \sin \theta$$

More specifically, because the image 104 can be of dimensions H and W, then it can be the case that $\theta \in [0, \pi)$ and $$r \in \left[ -\frac{\sqrt{H^2 + W^2}}{2}, \frac{\sqrt{H^2 + W^2}}{2} \right].$$

In various instances, the Cartesian-space of the image 104 can be considered as being of size H×W. In various cases, the Hough-space of the image 104 can be considered as being of size Θ×R, where Θ can be the number of quantization levels in the angle parameter, and where R can be the number of quantization levels in the distance parameter. Given these parameterizations and the equation above, a point in Cartesian-space can be considered as a sinusoid in Hough-space. Furthermore, if there are many points in Cartesian-space that collectively form a line, then there can be many sinusoids in Hough-space that collectively intersect at one point.

In various aspects, the set of Cartesian-space features 304 can be represented in three-dimensional tensor form as follows:

$$F = (f_{c,i,j}) \in \mathbb{R}^{C \times H \times W}$$

where F can be any of the set of Cartesian-space features 304, where $f_{c,i,j}$ can be an element of F at position (c,i,j), where c can be any suitable positive integer in [1,C], where i can be any suitable positive integer in [1, H], where j can be any suitable positive integer in [1, W], where C can be the number of channels in the image 104, and where $\mathbb{R}$ represents the set of all real numbers.

Furthermore, in various instances, each of the set of Hough-space features 308 can be represented in three-dimensional tensor form as follows:

$$S = (s_{c,k,l}) \in \mathbb{R}^{C \times \Theta \times R}$$

where S can be any one of the set of Hough-space features 308, where $S_{c,k,l}$ can be an element of S at position (c,k,l), where k can be any suitable positive integer in [1, Θ], and where l can be any suitable positive integer in [1,R].

In various cases, when given the above, the Hough transform can be represented as a linear mapping from F to S, where the Hough transform tensor can be denoted as $T = t(t_{i,j,k,l}) \in \mathbb{R}^{H \times W \times \Theta \times R}$ where:

$$t_{i,j,k,l} = \begin{cases} 1, & l = \left\lfloor \dfrac{i' \cos k' + j' \sin k' + \dfrac{\sqrt{H^2 + W^2}}{2}}{\Delta_r} \right\rfloor \\ 0, & \text{otherwise} \end{cases}$$

where $\lfloor \cdot \rfloor$ can denote the rounding-to-nearest-integer operator, where $$i' = i - \frac{H}{2}, \text{ where}$$

$$j' = \frac{W}{2}, \text{ where}$$

$$k' = k\Delta_\theta, \text{ where}$$

$$\Delta_\theta = \frac{\pi}{\Theta}, \text{ and where}$$

$$\Delta_r = \frac{\sqrt{H^2 + W^2}}{R - 1}.$$

Note that these formulas can treat the center of the image 104 as its origin. Furthermore, when given these formulas, the output Hough-space can be obtained (e.g., by the Hough layer 306) as follows:

$$s_{c,k,l} = \sum_{h=1}^{H} \sum_{w=1}^{W} f_{c,h,w} t_{h,w,k,l}$$

In this way, the Hough layer 306 can generate the set of Hough-space features 308. Note that, in various cases, the Hough layer 306 can apply the Hough transform to the set of Cartesian-space features 304 without having or implementing learnable/trainable parameters.

In various aspects, the heatmap block 310 can exhibit any suitable deep learning neural network architecture. That is, the heatmap block 310 can have any suitable numbers of any suitable types of neural network layers arranged in any suitable fashion or order. As a non-limiting example, the heatmap block 310 can have an input layer, followed by any suitable number of hidden layers, followed by an output layer. In various instances, any layers within the heatmap block 310 can have any suitable types of learnable/trainable parameters. For example, any layers within the heatmap block 310 can be dense neural network layers (e.g., whose learnable/trainable parameters can be weight matrices or bias values), can be convolutional neural network layers (e.g., whose learnable/trainable parameters can be convolutional kernels), or can be batch normalization layers (e.g., whose learnable/trainable parameters can be scale or shift factors). Relatedly, in various cases, any layers within the heatmap block 310 can be structured without learnable/trainable parameters. As some non-limiting examples, any layers of the heatmap block 310 can be pooling layers, up-sampling layers, down-sampling layers, padding layers, or concatenation layers. In various aspects, any suitable activation functions (e.g., sigmoid, softmax, hyperbolic tangent, rectified linear unit) can be implemented in any suitable neurons of the heatmap block 310. In various instances, any suitable interneuron connections (e.g., forward connections, skip connections, recurrent connections) can be implemented in the heatmap block 310.

Regardless of the architecture of the heatmap block 310, the execution component 114 can, in various aspects, electronically provide the set of Hough-space features 308 as input to the heatmap block 310, and the heatmap block 310 can produce an output based on the set of Hough-space features 308. In various instances, such output can be referred to as a set of Hough heatmaps 312. More specifically, the input layer of the heatmap block 310 can receive the set of Hough-space features 308, the set of Hough-space features 308 can complete a forward pass through the hidden layers of the heatmap block 310, and the output layer of the heatmap block 310 can compute the set of Hough heatmaps 312 using activation maps provided by the hidden layers of the heatmap block 310.

In various aspects, as shown, the set of Hough heatmaps 312 can have m heatmaps: a Hough heatmap 1 to a Hough heatmap m. Accordingly, the set of Hough heatmaps 312 can be considered as respectively corresponding (e.g., in one-to-one fashion) to the edges of the polygon 106. More specifically, each of the set of Hough heatmaps 312 can exhibit any suitable format, size, or dimensionality, and each of the set of Hough heatmaps 312 can be considered as containing encoded localization information regarding a respective edge of the polygon 106. For example, the Hough heatmap 1 can be any suitable number of scalars, any suitable number of vectors, any suitable number of matrices, or any suitable number of tensors. Moreover, the Hough heatmap 1 can correspond to a first edge of the polygon 106, meaning that the Hough heatmap 1 can contain encoded information that conveys where the first edge of the polygon 106 is located within the image 104. As another example, the Hough heatmap m can be any suitable number of scalars, any suitable number of vectors, any suitable number of matrices, or any suitable number of tensors. Furthermore, the Hough heatmap m can correspond to an m-th edge of the polygon 106, meaning that the Hough heatmap m can contain encoded information that conveys where the m-th edge of the polygon 106 is located within the image 104. In various aspects, different ones of the set of Hough heatmaps 312 can have the same or different formats, sizes, or dimensionalities as each other.

Figure 4:
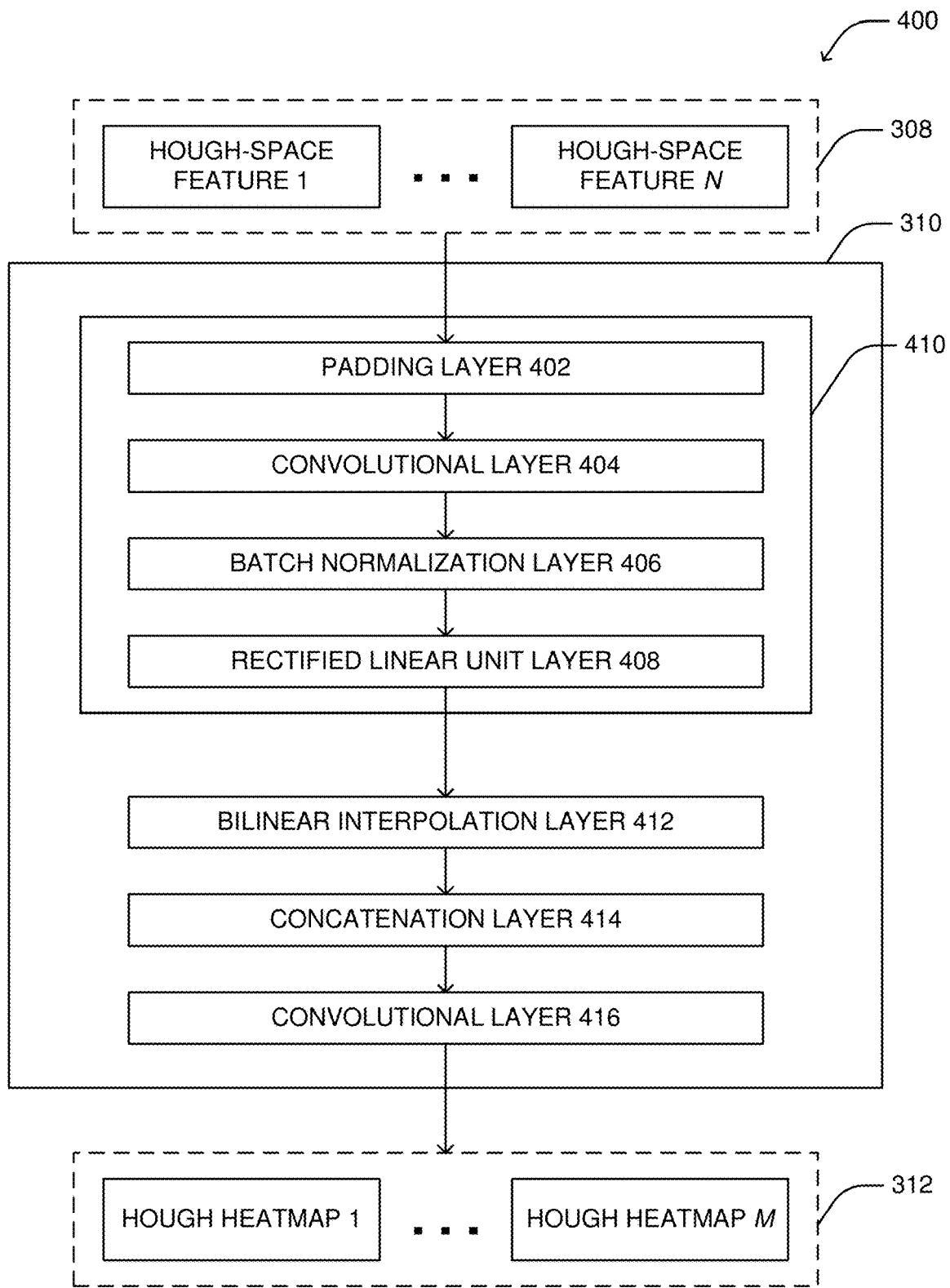
FIG. 4 illustrates an example, non-limiting block diagram of a heatmap block of a deep learning pipeline in accordance with various examples described herein.

Various non-limiting aspects of the heatmap block 310 are described with respect to FIG. 4. In particular, FIG. 4 illustrates an example, non-limiting block diagram 400 of the heatmap block 310 (e.g., illustrates an example, non-limiting internal architecture of the heatmap block 310).

In various aspects, as shown, the heatmap block 310 can comprise a padding layer 402, a convolutional layer 404, a batch normalization layer 406, a rectified linear unit layer 408, a bilinear interpolation layer 412, a concatenation layer 414, or a convolutional layer 416. In various instances, the convolutional layer 404 can follow (e.g., be downstream of) the padding layer 402, the batch normalization layer 406 can follow the convolutional layer 404, the rectified linear unit layer 408 can follow the batch normalization layer 406, the bilinear interpolation layer 412 can follow the rectified linear unit layer 408, the concatenation layer 414 can follow the bilinear interpolation layer 412, or the convolutional layer 416 can follow the concatenation layer 414.

In various aspects, the execution component 114 can provide the set of Hough-space features 308 to the padding layer 402. In various instances, the padding layer 402 can be any suitable neural network layer that can apply any suitable type of padding to the set of Hough-space features 308. As a non-limiting example, the padding layer 402 can apply zero-padding around the boundaries or sides of each of the set of Hough-space features 308. As another non-limiting example, the padding layer 402 can apply circular-padding around the boundaries or sides of each of the set of Hough-space features 308. As even another non-limiting example, the padding layer 402 can apply any suitable combination of zero-padding and circular-padding around the boundaries or sides of each of the set of Hough-space features 308. For instance, the padding layer 402 can, in some aspects, apply zero-padding to left boundaries or right boundaries (e.g., to left or right sides) of each of the set of Hough-space features 308 and can apply circular-padding to top boundaries or bottom boundaries (e.g., to top or bottom sides) of each of the set of Hough-space features 308. In various instances, such combination of zero-padding and circular-padding can be warranted due to the periodicity of the angle parameter of a line. That is, a line can be considered as unchanged after having rotated 180 degrees or $\pi$ radians (e.g., $\theta=\theta+g\pi$, for all integers g). In any case, the padding layer 402 can apply any suitable padding to each of the set of Hough heatmaps 312, thereby yielding a set of padded features (not explicitly shown). Note that the padding layer 402 can, in various instances, lack learnable/trainable parameters (e.g., padding can be applied without learnable/trainable parameters).

In various aspects, the execution component 114 can provide the set of padded features to the convolutional layer 404. In various instances, the convolutional layer 404 can be any suitable neural network layer that can convolve each of the set of padded features via any suitable convolutional kernel (e.g., any suitable number of convolutional kernels). In various cases, a convolutional kernel applied by the convolutional layer 404 can exhibit any suitable format, size, or dimensionality. As a non-limiting example, a convolutional kernel applied by the convolutional layer 404 can have a 3-by-3 format, size, or dimensionality. No matter the formats, sizes, or dimensionalities of such convolutional kernels, the convolutional layer 404 can convolve each of the set of padded features with such convolutional kernels (e.g., different ones of the set of padded features can be convolved with the same or different convolutional kernels as each other), thereby yielding a set of convolved features (not explicitly shown). Note that the elements of a convolutional kernel can be considered as learnable or updatable parameters that can be adjusted during training.

In various aspects, the execution component 114 can provide the set of convolved features to the batch normalization layer 406. In various instances, the batch normalization layer 406 can be any suitable neural network layer that can apply any suitable batch normalization technique (e.g., using any suitable scale factor or shift factor) to each of the set of convolved features. In various cases, the batch normalization layer 406 can batch-normalize each of the set of convolved features, thereby yielding a set of batch-normalized features (not explicitly shown). Note that the scale factor or shift factor of the batch normalization layer 406 can be considered as learnable/trainable parameters.

In various aspects, the execution component 114 can provide the set of batch-normalized features to the rectified linear unit layer 408. In various instances, the rectified linear unit layer 408 can be any suitable neural network layer that can apply a rectified linear unit (ReLU) function to each of the set of batch-normalized features. In various cases, the output produced by the rectified linear unit layer 408 can be referred to as a set of ReLU-transformed features (not explicitly shown). Note that the rectified linear unit layer 408 can, in various instances, lack learnable/trainable parameters (e.g., the rectified linear unit function can be applied without learnable/trainable parameters).

In some instances, the padding layer 402, the convolutional layer 404, the batch normalization layer 406, and the rectified linear unit layer 408 can be considered as collectively forming a convolutional block 410. Although not explicitly shown in FIG. 4, the convolutional block 410 can be repeated or duplicated any suitable number of times. For instance, suppose that the convolutional block 410 is repeated/duplicated q times for any suitable positive integer q. In such case, the heatmap block 310 can be considered as having a sequence of q convolutional blocks chained together in series, with each of such q convolutional blocks being made up of a padding layer, a convolutional layer, a batch normalization layer, and a rectified linear unit layer. Furthermore, in such case, the output of the q-th (e.g., last) convolutional block can be referred to as the set of ReLU-transformed features. In some instances, q can be equal to 2.

In various aspects, the execution component 114 can provide the set of ReLU-transformed features to the bilinear interpolation layer 412. In various instances, the bilinear interpolation layer 412 can be any suitable neural network layer that can apply bilinear-interpolation to each of the set of ReLU-transformed features, so as to cause the set of ReLU-transformed features to have the same format, size, or dimensionality as each other. In various cases, the output of the bilinear interpolation layer 412 can be referred to as a set of up-sampled features. Note that the bilinear interpolation layer 412 can, in various instances, lack learnable/trainable parameters (e.g., up-sampling, such as bilinear interpolation, can be applied without learnable/trainable parameters).

In various aspects, the execution component 114 can provide the set of up-sampled features to the concatenation layer 414. In various instances, the concatenation layer 414 can be any suitable neural network layer that can concatenate the set of up-sampled features together, thereby yielding a concatenation. Note that the concatenation layer 414 can, in various instances, lack learnable/trainable parameters (e.g., concatenation can be applied without learnable/trainable parameters).

In various aspects, the execution component 114 can provide the concatenation to the convolutional layer 416. In various instances, the convolutional layer 416 can be any suitable neural network layer that can convolve the concatenation via any suitable convolutional kernel. In various cases, the convolutional kernel applied by the convolutional layer 416 can exhibit any suitable format, size, or dimensionality. As a non-limiting example, the convolutional kernel applied by the convolutional layer 416 can have a 1-by-1 format, size, or dimensionality. No matter the format, size, or dimensionality of the convolutional kernel, the convolutional layer 416 can convolve the concatenation. In various aspects, the output of the convolutional layer 416 can be the set of Hough heatmaps 312. Note that the elements of the convolutional kernel of the convolutional layer 416 can be considered as learnable/trainable parameters.

Referring back to FIG. 3, the execution component 114 can, in various aspects, provide the set of Hough heatmaps 312 to the argmax layer 314 and to the circular-softmax block 316. In various instances, as described herein, the argmax layer 314 or the circular-softmax block 316 can generate the set of edge parameter tuples 202 based on the set of Hough heatmaps 312. In various cases, as shown, the set of edge parameter tuples 202 can include m tuples: an edge parameter tuple 1 to an edge parameter tuple m. Accordingly, the set of edge parameter tuples 202 can be considered as respectively corresponding (e.g., in one-to-one fashion) to the edges of the polygon 106. More specifically, each of the set of edge parameter tuples 202 can exhibit any suitable format, size, or dimensionality and can represent, indicate, or otherwise convey the location within the image 104 of a respective edge of the polygon 106.

For instance, the edge parameter tuple 1 can be any suitable number of scalars, any suitable number of vectors, any suitable number of matrices, or any suitable number of tensors. Moreover, the edge parameter tuple 1 can correspond to the first edge of the polygon 106, meaning that the edge parameter tuple 1 can convey or otherwise indicate where the first edge of the polygon 106 is located within the image 104. As a non-limiting example, the edge parameter tuple 1 can be a two-element vector, where an element of such two-element vector can be the angle (e.g., θ) of the normal of the first edge of the polygon 106, or where another element of such two-element vector can be the distance (e.g., r) of such normal.

Likewise, the edge parameter tuple m can be any suitable number of scalars, any suitable number of vectors, any suitable number of matrices, or any suitable number of tensors. Furthermore, the edge parameter tuple m can correspond to the m-th edge of the polygon 106, meaning that the edge parameter tuple m can convey or otherwise indicate where the m-th edge of the polygon 106 is located within the image 104. As a non-limiting example, the edge parameter tuple m can be a two-element vector, where an element of such two-element vector can be the angle (e.g., θ) of the normal of the m-th edge of the polygon 106, and where another element of such two-element vector can be the distance (e.g., r) of such normal.

Accordingly, the set of edge parameter tuples 202 can be considered as indicating or representing the locations of the edges of the polygon 106. In various cases, the locations of vertices (e.g., corners) of the polygon 106 can be geometrically derived from the set of edge parameter tuples 202 (e.g., when the parameters of the edges of the polygon 106 are obtained, the vertices of the polygon 106 can be considered as the intersections between those edges). In any case, the set of edge parameter tuples 202 can be considered as the result of performing polygon localization on the image 104.

Figure 5:
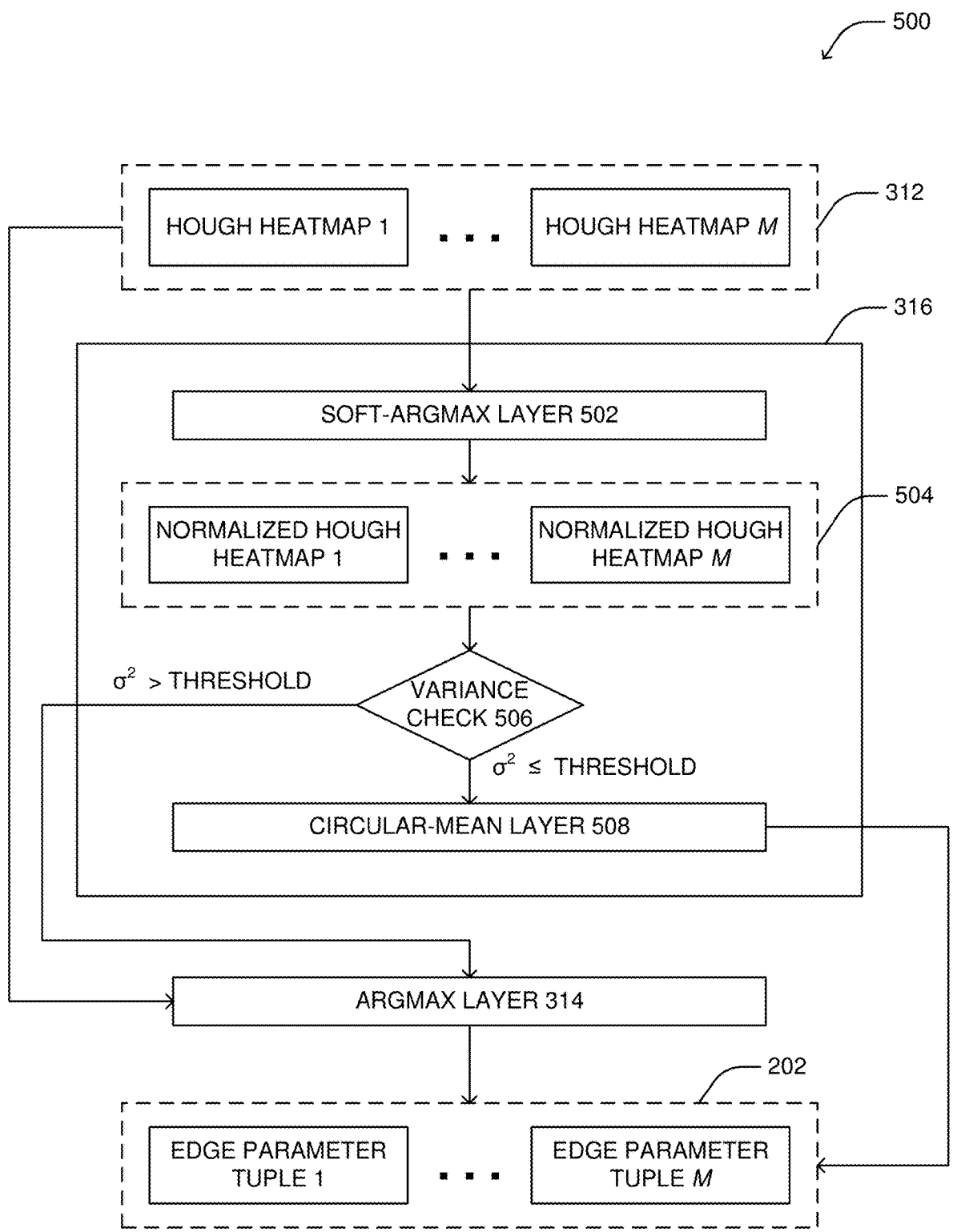
FIG. 5 illustrates an example, non-limiting block diagram of a circular-softmax block of a deep learning pipeline in accordance with various examples described herein.

Various non-limiting aspects of the circular-softmax block 316 or the argmax layer 314 are described with respect to FIG. 5. In particular, FIG. 5 illustrates an example, non-limiting block diagram 500 of the circular-softmax block 316 in accordance with various examples described herein.

In various aspects, as shown, the circular-softmax block 316 can comprise a soft-argmax layer 502, a variance check 506, or a circular-mean layer 508. In various instances, the variance check 506 can follow (e.g., can be downstream of) the soft-argmax layer 502. In various cases, the circular-mean layer 508 can follow the variance check 506.

In various aspects, the execution component 114 can provide the set of Hough heatmaps 312 to the soft-argmax layer 502. In various instances, the soft-argmax layer 502 can be any suitable neural network layer that can apply a soft-argmax function to each of the set of Hough heatmaps 312. For example, the soft-argmax layer 502 can apply the soft-argmax function to the Hough heatmap 1, which can cause the Hough heatmap 1 to become normalized. In various cases, such normalized version of the Hough heatmap 1 can be referred to as a normalized Hough heatmap 1 (e.g., the elements of the normalized Hough heatmap 1 can exhibit the same relative proportions as of those of the Hough heatmap 1, but the elements of the normalized Hough heatmap 1 can be non-negative and can sum to unity). Likewise, the soft-argmax layer 502 can apply the soft-argmax function to the Hough heatmap m, which can cause the Hough heatmap m to become normalized. In various cases, such normalized version of the Hough heatmap m can be referred to as a normalized Hough heatmap m (e.g., the elements of the normalized Hough heatmap m can exhibit the same relative proportions as of those of the Hough heatmap m, but the elements of the normalized Hough heatmap m can be non-negative and can sum to unity). In various aspects, the normalized Hough heatmap 1 to the normalized Hough heatmap m can be collectively referred to as a set of normalized Hough heatmaps 504.

Note that the soft-argmax layer 502 can, in various instances, lack learnable/trainable parameters (e.g., the soft-argmax function can be applied without learnable/trainable parameters).

In various aspects, the set of Hough heatmaps 312 can be denoted as follows:

$$V = (v_{l,i,j}) \in \mathbb{R}^{m \times \Theta \times R}$$

where V can represent the set of Hough heatmaps 312, where $v_{l,i,j}$ can represent an element of V located at position (l, i, j), where l can be any integer in [1, m] (e.g., where l can denote one of the m edges of the polygon 106), where i can be any integer in [1, Θ], and where j can be any integer in [1, R]. In such case, the set of normalized Hough heatmaps 504 can be denoted as follows:

$$P = (p_{l,i,j}) = \text{softargmax}(v_{l,i,j}) = \frac{e^{v_{l,i,j}}}{\sum_{a=1}^{\Theta} \sum_{b=1}^{R} e^{v_{l,a,b}}} \in \mathbb{R}^{m \times \Theta \times R}$$

where P can represent the set of normalized Hough heatmaps 504, and where $p_{l,i,j}$ can represent an element of P located at position (l, i, j). In various instances, application of the soft-argmax operator can ensure that the set of normalized Hough heatmaps 504 represent a valid probability distribution over Θ×R possible outcomes. In this way, the soft-argmax layer 502 can generate the set of normalized Hough heatmaps 504 based on the set of Hough heatmaps 312.

In various aspects, the execution component 114 can provide the set of normalized Hough heatmaps 504 to the variance check 506. In various instances, the variance check 506 can be any suitable neural network layer that can compute a variance of the set of normalized Hough heatmaps 504 and that can compare such variance to any suitable threshold value. If the computed variance is below (or equal to) the threshold value, then the variance check 506 can permit the circular-mean layer 508 to operate or can prohibit the argmax layer 314 from operating. In contrast, if the computed variance is above the threshold value, then the variance check 506 can prohibit the circular-mean layer 508 from operating or can permit the argmax layer 314 to operate.

More specifically, in various aspects, a discrete random variable $\Phi_l$ can be defined for the angle parameter (e.g., θ) of an edge/of the polygon 106. Moreover, a discrete random variable $D_l$ can be defined for the distance parameter (e.g., r) of the edge/of the polygon 106. In various instances, the sample space of $\Phi_l$ can be given as follows:

$$G_{\Phi_l} = \left\{ \varphi_i : \varphi_i = -1 + i\frac{2}{\theta},\ i \in \{0, 1, \ldots, \Theta - 1\} \right\}$$

Similarly, in various cases, the sample space of $D_l$ can be given as follows:

$$G_{D_l} = \left\{ d_j : d_j = -1 + j\frac{2}{R-1},\ j \in \{0, 1, \ldots, R-1\} \right\}$$

Note that, in such case, the range of $\varphi_i$ can be considered as [−1,1), and the range of $d_j$ can be [−1,1].

When given these sample spaces, a variance of $\Phi_l$ can be computed as follows:

$$\sigma_{\Phi_l}^2 = \text{Var}[\Phi_l] = \mathbb{E}[\Phi_l^2] - \mathbb{E}[\Phi_l]^2$$

where $$\mathbb{E}[\Phi_l] = \frac{\arctan\frac{\mathbb{E}[Y_l]}{\mathbb{E}[X_l]}}{\pi} = \frac{\arctan\frac{\sum_{i=1}^{\Theta}\sum_{j=1}^{R}\sin(\varphi_i \pi)p_{l,i,j}}{\sum_{i=1}^{\Theta}\sum_{j=1}^{R}\cos(\varphi_i \pi)p_{l,i,j}}}{\pi}$$

where $Y_l = \sin(\Phi_l \pi)$, and where $X_l = \cos(\Phi_l \pi)$ for the edge l of the polygon 106. Note that, since $\Phi_l$ and $\mathbb{E}[\Phi_l]$ can be obtained as above, then $\mathbb{E}[\Phi_l^2]$ can be derived (e.g., by squaring $\Phi_l$ and then computing expected value of such square as above). Likewise, when given these sample spaces, a variance of $D_l$ can be computed as follows:

$$\sigma_{D_l}^2 = \text{Var}[D_l] = \mathbb{E}[D_l^2] - \mathbb{E}[D_l]^2$$

where $$\mathbb{E}[D_l] = \sum_{i=1}^{\Theta}\sum_{j=1}^{R} d_j p_{l,i,j}$$

Again, note that, since $D_l$ and $\mathbb{E}[D_l]$ can be obtained as above, then $\mathbb{E}[D_l^2]$ can be derived (e.g., by squaring $D_l$ and then computing expected value of such square as above).

In various aspects, the variance check 506 can compute such variances for each edge of the polygon 106 (e.g., for every l). If there is any positive integer l in [1, m] for which $\sigma_{\Phi_l}^2 < \sigma_{\varphi,\ thres}^2$ or $\sigma_{D_l}^2 < \sigma_{d,\ thres}^2$ for any suitable real numbers $\sigma_{\varphi,\ thres}^2$ and $\sigma_{d,\ thres}^2$, then the variance check 506 can prohibit the circular-mean layer 508 from operating or can permit the argmax layer 314 to operate. In contrast, if $\sigma_{\Phi_l}^2 \leq \sigma_{\varphi,\ thres}^2$ and if $\sigma_{D_l}^2 \leq \sigma_{d,\ thres}^2$ for all positive integers l in [1,m], then the variance check 506 can permit the circular-mean layer 508 to operate or can prohibit the argmax layer 314 from operating.

Note that the variance check 506 can, in various instances, lack learnable/trainable parameters (e.g., computation or comparison of variance can be applied without learnable/trainable parameters).

Note further that, in various aspects, the values of $\sigma_{\varphi,\ thres}^2$ and $\sigma_{d,\ thres}^2$ can be context-dependent and thus can have different values in different operational contexts. In various cases, $\sigma_{\varphi,\ thres}^2$ and $\sigma_{d,\ thres}^2$ can be chosen empirically/experimentally to identify which values of $\sigma_{\varphi,\ thres}^2$ and $\sigma_{d,\ thres}^2$ cause the deep learning pipeline 116 to yield the highest polygon localization accuracy levels in a given operational context of the deep learning pipeline 116. In some non-limiting examples, $\sigma_{\varphi,\ thres}^2 = 0.8$ and $\sigma_{d,\ thres}^2 = 0.001$.

In various aspects, if the variance check 506 permits the circular-mean layer 508 to operate, then the execution component 114 can provide the set of normalized Hough heatmaps 504 to the circular-mean layer 508. In various instances, the circular-mean layer 508 can be any suitable neural network layer that can apply a circular-mean function to the set of normalized Hough heatmaps 504. In various cases, application of the circular-mean function to the set of normalized Hough heatmaps 504 can yield the set of edge parameter tuples 202.

As a non-limiting example, for any given edge l of the polygon 106 (e.g., for any suitable positive integer l in [1, m]), the circular-mean layer 508 can compute the angle-parameter $\theta_l$ of such edge and the distance-parameter $r_l$ of such edge as follows:

$$\theta_l = \mathbb{E}[\Phi_l]\frac{\pi}{2} + \frac{\pi}{2}$$

and $$r_l = \mathbb{E}[D_l]\frac{\sqrt{H^2 + W^2}}{2}$$

where $$\mathbb{E}[\Phi_l] = \frac{\arctan\frac{\sum_{i=1}^{\Theta}\sum_{j=1}^{R}\sin(\varphi_i\pi)p_{l,i,j}}{\sum_{i=1}^{\Theta}\sum_{j=1}^{R}\cos(\varphi_i\pi)p_{l,i,j}}}{\pi}$$

and where $$\mathbb{E}[D_l] = \sum_{i=1}^{\Theta}\sum_{j=1}^{R}d_j p_{l,i,j}$$

In various aspects, the above expression for $\mathbb{E}[\Phi_l]$ can be considered as an application of the circular-mean function, as opposed to an application of the arithmetic mean function.

In this way, the circular-mean layer 508 can obtain the parameters of any edge of the polygon 106 via application of the circular-mean function. For example, the circular-mean layer 508 can obtain the edge parameter tuple 1 (e.g., can obtain $\theta_1$ or $r_1$) based on applying the circular-mean function to the normalized Hough heatmap 1. Similarly, the circular-mean layer 508 can obtain the edge parameter tuple m (e.g., can obtain $\theta_m$ or $r_m$) based on applying the circular-mean function to the normalized Hough heatmap m.

On the other hand, if the variance check 506 instead permits the argmax layer 314 to operate, then the execution component 114 can provide the set of Hough heatmaps 312 (e.g., not the set of normalized Hough heatmaps 504) to the argmax layer 314 (e.g., as shown, a branch can couple the set of Hough heatmaps 312 to the argmax layer 314). In various instances, the argmax layer 314 can be any suitable neural network layer that can apply an argmax function to the set of Hough heatmaps 312. In various cases, application of the argmax function to the set of Hough heatmaps 312 can yield the set of edge parameter tuples 202. For instance, the argmax layer 314 can obtain the edge parameter tuple 1 (e.g., can obtain $\theta_1$ or $r_1$) based on applying the argmax function to the Hough heatmap 1. Likewise, the argmax layer 314 can obtain the edge parameter tuple m (e.g., can obtain $\theta_m$ or $r_m$) based on applying the argmax function to the Hough heatmap m.

In various aspects, because the operation of the argmax layer 314 and the circular-mean layer 508 can be conditional upon the variance check 506, the variance check 506 can be considered as performing a gatekeeping functionality with respect to the argmax layer 314 and to the circular-mean layer 508. In other words, the argmax layer 314 and the circular-mean layer 508 can each be considered as being threshold-triggered or threshold-controlled.

Note that, because the argmax layer 314 can be able to generate the set of edge parameter tuples 202 based on the set of Hough heatmaps 312, and because the circular-softmax block 316 can also be able to generate the set of edge parameter tuples 202 based on the set of Hough heatmaps 312, the argmax layer 314 and the circular-softmax block 316 can be considered as being in parallel with each other.

In any case, the argmax layer 314 or the circular-softmax block 316 can generate the set of edge parameter tuples 202. In various instances, as mentioned above, the set of edge parameter tuples 202 can be considered as the localization results corresponding to the edges of the polygon 106.

To help cause the set of edge parameter tuples 202 to be accurate, the deep learning pipeline 116 can first undergo training. As a non-limiting example, the deep learning pipeline 116 can undergo supervised training based on an annotated training dataset (not shown). In such case, the annotated training dataset can include training images (e.g., each training image depicting an m-sided polygon). Moreover, the annotated training dataset can include a set of ground-truth edge parameter tuples for each training image. In various aspects, the internal parameters of the deep learning pipeline 116 (e.g., the weights, biases, or convolutional kernels of the backbone network 302; the weights, biases, or convolutional kernels of the heatmap block 310) can be randomly initialized.

In various aspects, a training image and a set of ground-truth edge parameter tuples corresponding to that training image can be selected from the annotated training dataset. In various instances, the selected training image can be fed as input to the deep learning pipeline 116, the selected training image can complete a forward pass through the deep learning pipeline 116, and the deep learning pipeline 116 can produce some output based on the selected training image (e.g., can predict/infer edge parameter tuples for the selected training image). In various cases, an error or loss (e.g., cross-entropy) can be computed between the output and the selected set of ground-truth edge parameter tuples, and the internal parameters of the deep learning pipeline 116 can be updated by performing backpropagation (e.g., stochastic gradient descent) driven by such computed error/loss.

In various aspects, such training procedure can be repeated for each training image in the annotated training dataset, which can cause the internal parameters (e.g., learnable/trainable weights, learnable/trainable biases, learnable/trainable convolutional kernels) of the deep learning pipeline 116 to achieve post-training values that enable accurate localization of m-sided polygons depicted/illustrated in inputted images. In various instances, any suitable training batch sizes, any suitable training termination criteria, or any suitable error/loss functions can be implemented during such training.

Although the above example focuses on supervised training, this is a mere non-limiting example for ease of explanation. In various other examples, the deep learning pipeline 116 can undergo or have undergone unsupervised training or reinforcement training. No matter the type/paradigm of training, the polygon localization system 102 can facilitate or perform such training on the deep learning pipeline 116 (e.g., prior to executing the deep learning pipeline 116 on the image 104).

Figure 6:
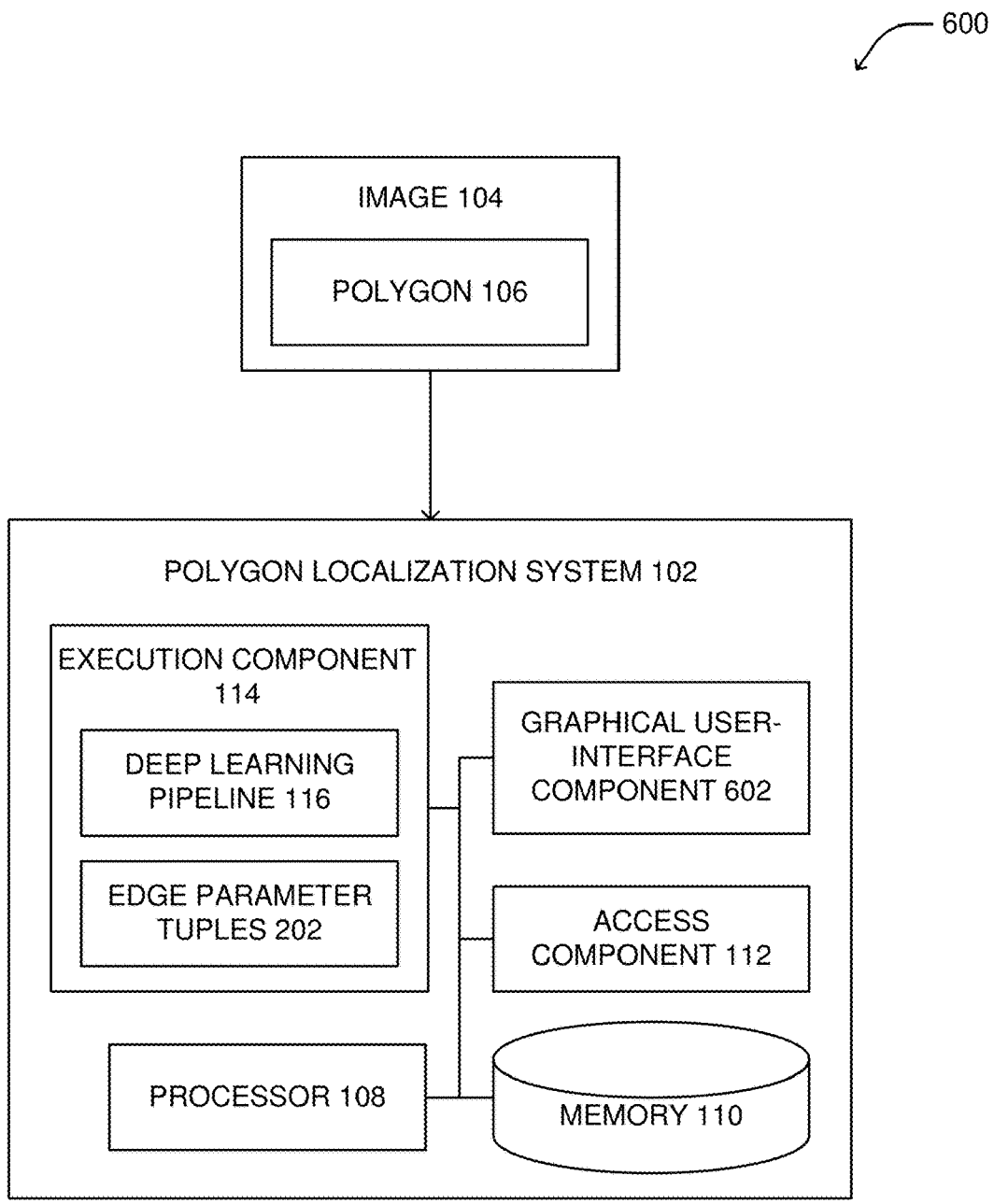
FIG. 6 illustrates a block diagram of an example, non-limiting apparatus including a graphical user-interface component that can facilitate polygon localization via a deep learning pipeline having a circular-softmax block in accordance with various examples described herein.

FIG. 6 illustrates a block diagram of an example, non-limiting apparatus 600 including a graphical user-interface component that can facilitate polygon localization via a deep learning pipeline having a circular-softmax block in accordance with various examples described herein. As shown, the apparatus 600 can, in various cases, comprise the same component as the apparatus 200, and can further comprise a graphical user-interface component 602.

In various aspects, the graphical user-interface component 602 can be, comprise, or otherwise have access to any suitable graphical user-interface (e.g., any suitable electronic display, screen, or monitor). In various instances, the graphical user-interface component 602 can visually render the localized edges of the polygon 106 so as to have or exhibit visual emphasis. Indeed, as mentioned above, each of the set of edge parameter tuples 202 can indicate or represent the location or orientation of a respective edge of the polygon 106. Accordingly, based on the set of edge parameter tuples 202, the graphical user-interface component 602 can geometrically determine (e.g., by computing the intersections of the lines indicated by the edge parameter tuples 202) which pixels of the image 104 belong to or otherwise make up the edges of the polygon 106, and the graphical user-interface component 602 can visually enhance (e.g., increase the intensities of, change the colors of, highlight) those pixels. In this way, a technician associated with the polygon localization system 102 can visually see the localization results generated by the deep learning pipeline 116.

Note that the graphical user-interface component 602 (and thus rendered visualizations of localized edges of the polygon 106) can be implemented in various non-limiting examples. In various other non-limiting examples, the graphical user-interface component 602 can be omitted. In such instances, the polygon localization system 102 can localize edges of the polygon 106 without visually rendering such localized edges. In such cases, the polygon localization system 102 can instead transmit the set of edge parameter tuples 202 (which can be considered as a result of performing polygon localization on the image 104) to any suitable computing device (not shown).

Figure 7:
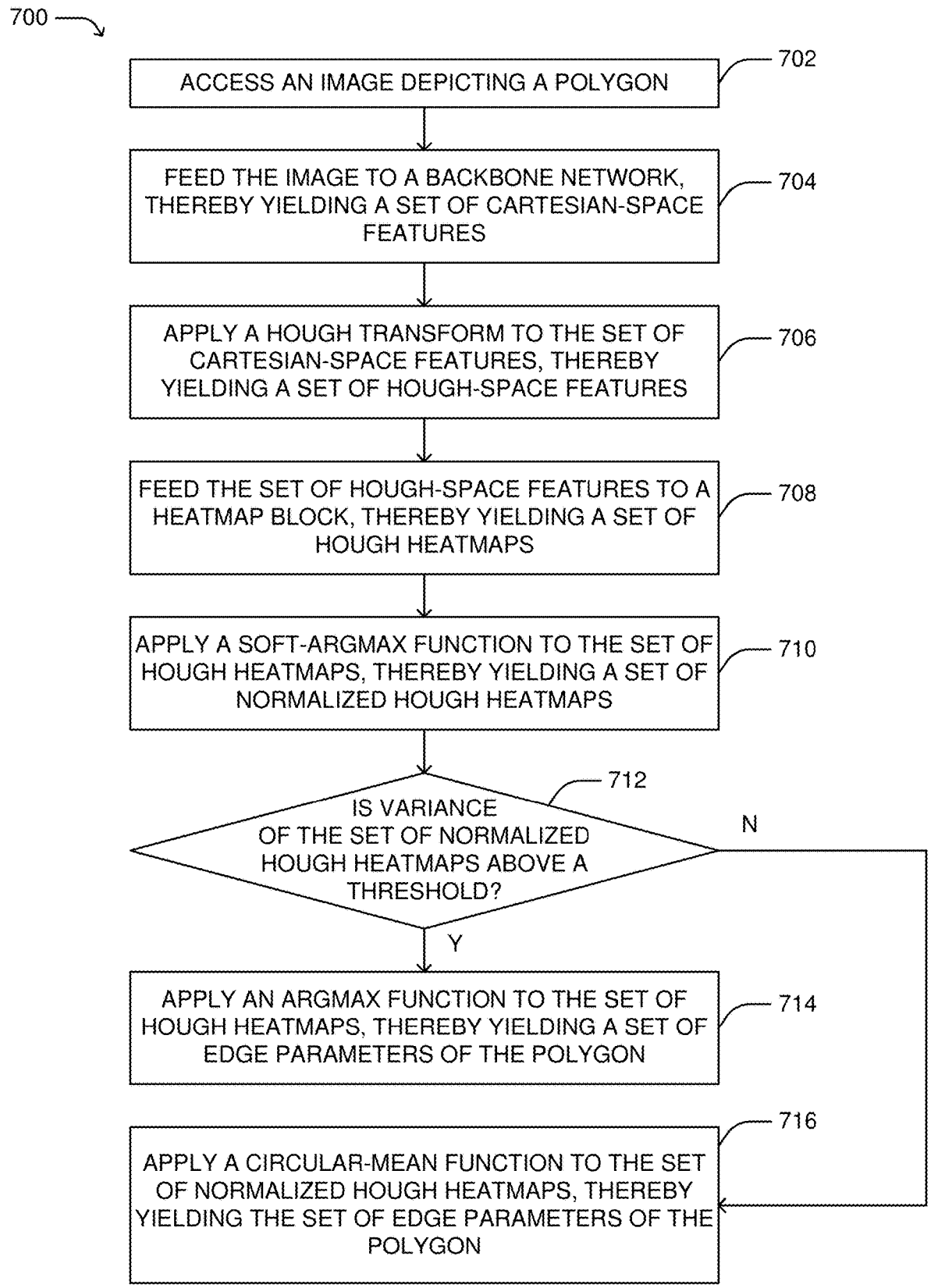
FIG. 7 illustrates a flow diagram of an example, non-limiting computer-implemented method that can facilitate polygon localization via a deep learning pipeline having a circular-softmax block in accordance with various examples described herein.

FIG. 7 illustrates a flow diagram of an example, non-limiting computer-implemented method 700 that can facilitate polygon localization via a deep learning pipeline having a circular-softmax block in accordance with various examples described herein. In various cases, the polygon localization system 102 can facilitate the computer-implemented method 700.

In various aspects, act 702 can include accessing, by a device (e.g., via 112) operatively coupled to a processor (e.g., 108), an image (e.g., 104) depicting a polygon (e.g., 106).

In various instances, act 704 can include feeding, by the device (e.g., via 114), the image to a backbone network (e.g., 302). In various cases, this can yield a set of Cartesian-space features (e.g., 304).

In various aspects, act 706 can include applying, by the device (e.g., via 306), a Hough transform to the set of Cartesian-space features. In various cases, this can yield a set of Hough-space features (e.g., 308).

In various instances, act 708 can include feeding, by the device (e.g., via 114), the set of Hough-space features to a heatmap block (e.g., 310). In various cases, this can yield a set of Hough heatmaps (e.g., 312).

In various aspects, act 710 can include applying, by the device (e.g., via 502), a soft-argmax function to the set of Hough heatmaps. In various cases, this can yield a set of normalized Hough heatmaps (e.g., 504).

In various instances, act 712 can include determining, by the device (e.g., via 506), whether a variance of the set of normalized Hough heatmaps is above a threshold. If so, the computer-implemented method 700 can proceed to act 714. If not, the computer-implemented method 700 can instead proceed to act 716.

In various aspects, act 714 can include applying, by the device (e.g., via 314), an argmax function to the set of Hough heatmaps. In various cases, this can yield a set of edge parameters (e.g., 202) of the polygon.

In various instances, act 716 can include applying, by the device (e.g., via 508), a circular-mean function to the set of normalized Hough heatmaps. In various cases, this can yield the set of edge parameters of the polygon.

Various experiments were performed to validate various examples described herein. In such experiments, a non-limiting example of the deep learning pipeline 116 was reduced to practice. Specifically, such example reduction to practice of the deep learning pipeline 116 was trained to localize quadrilaterals (e.g., four-sided polygons) representing documents depicted in inputted images. In various instances, such example reduction to practice was pitted against various state-of-the-art quadrilateral localization systems. When executed on a validation dataset containing no quadrilateral occlusion, the state-of-the-art quadrilateral localization systems exhibited accuracy levels as low as 0.5470 and as high as 0.9225, whereas the example reduction to practice of the deep learning pipeline 116 exhibited an accuracy level of 0.9827. When executed on a validation dataset containing quadrilateral occlusion, the state-of-the-art quadrilateral localization systems exhibited accuracy levels as low as 0.5950 and as high as 0.8274, whereas the example reduction to practice of the deep learning pipeline 116 exhibited an accuracy level of 0.9764. These experimental results demonstrate that implementation of the circular-softmax block 316 as described herein can, in various aspects, cause an increase in polygon localization accuracy.

Figure 8:
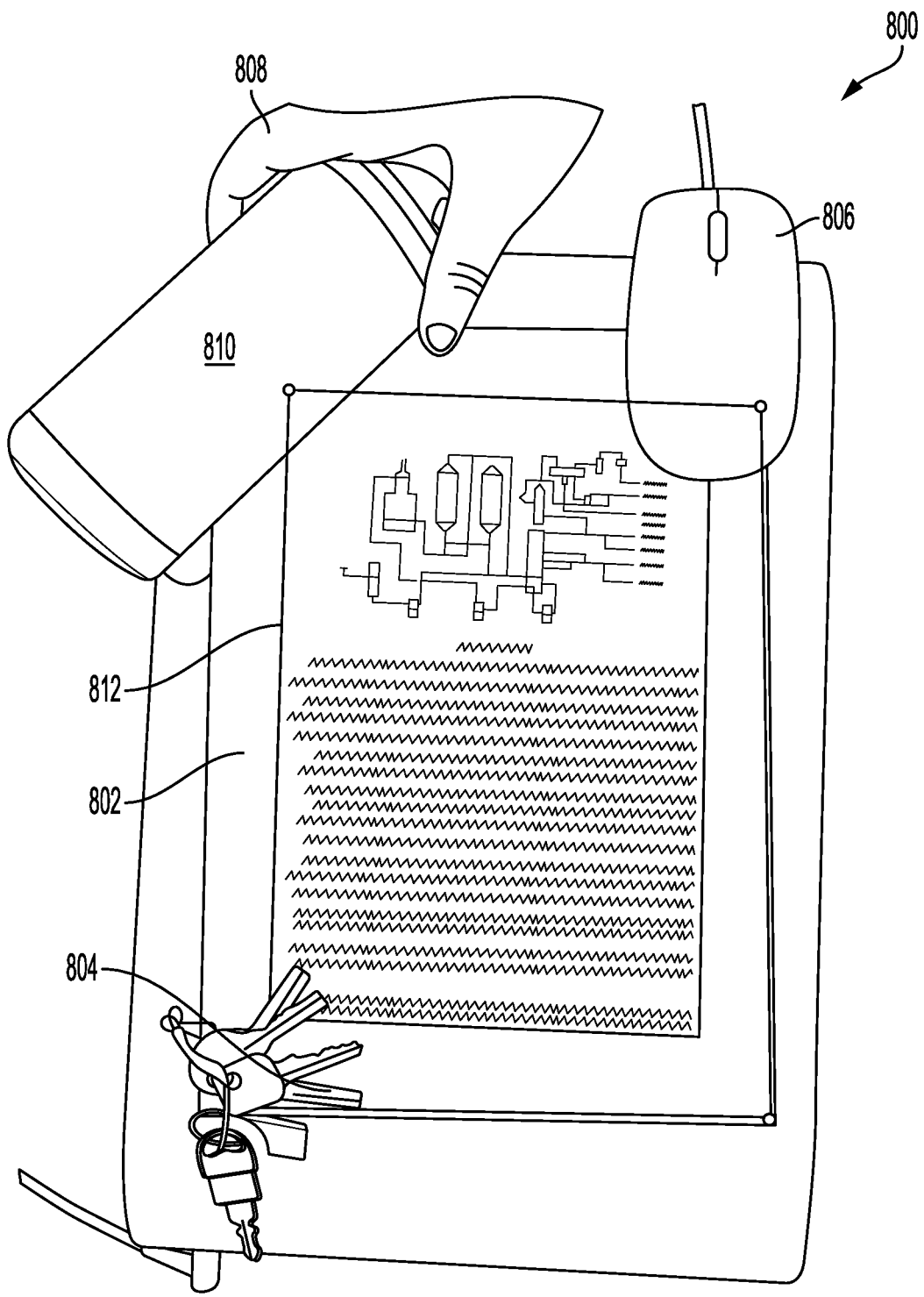
FIGS. 8-10 illustrate example, non-limiting polygon localization results that show how various examples described herein can increase polygon localization accuracy.
Figure 9:
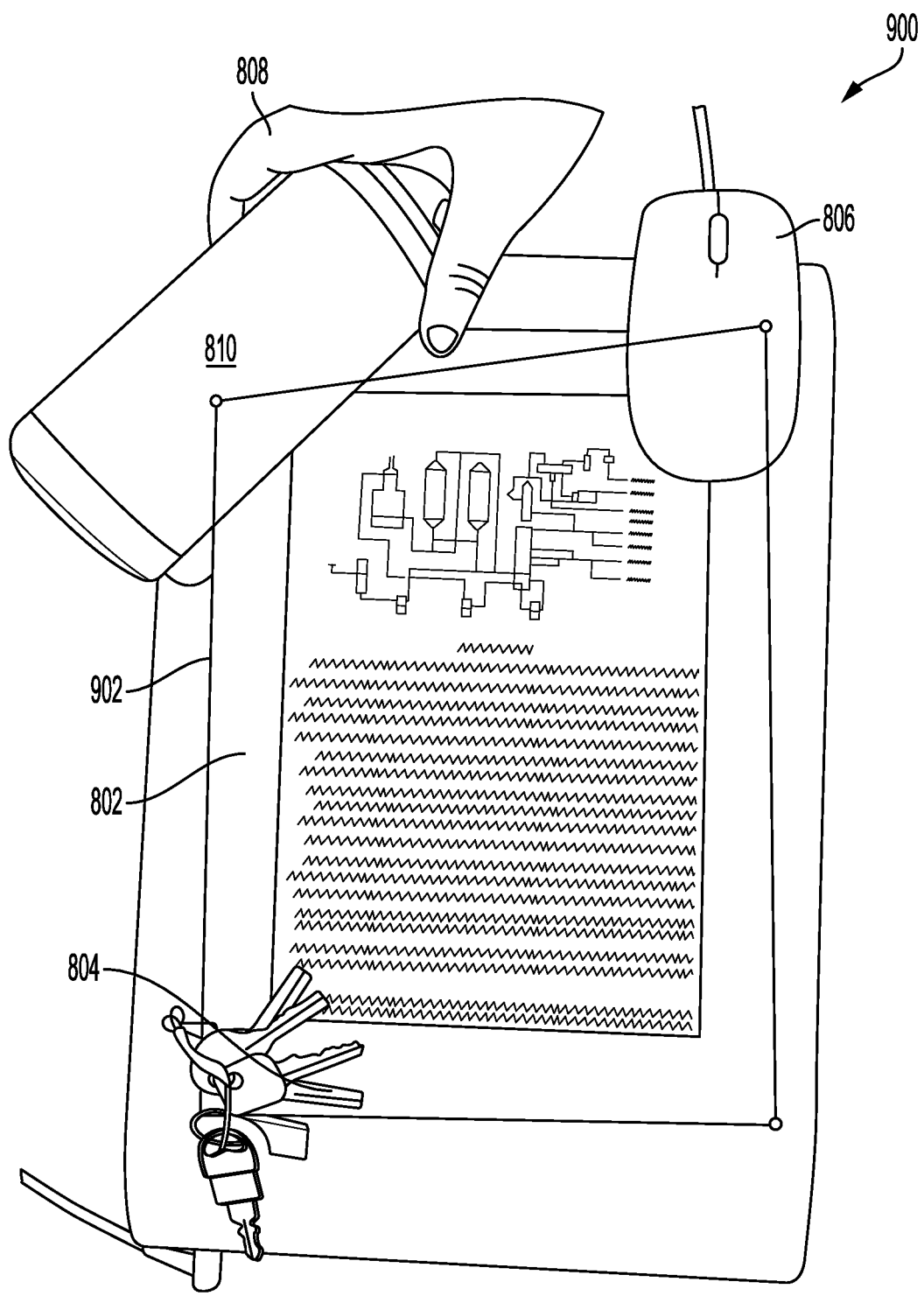
Figure 10:
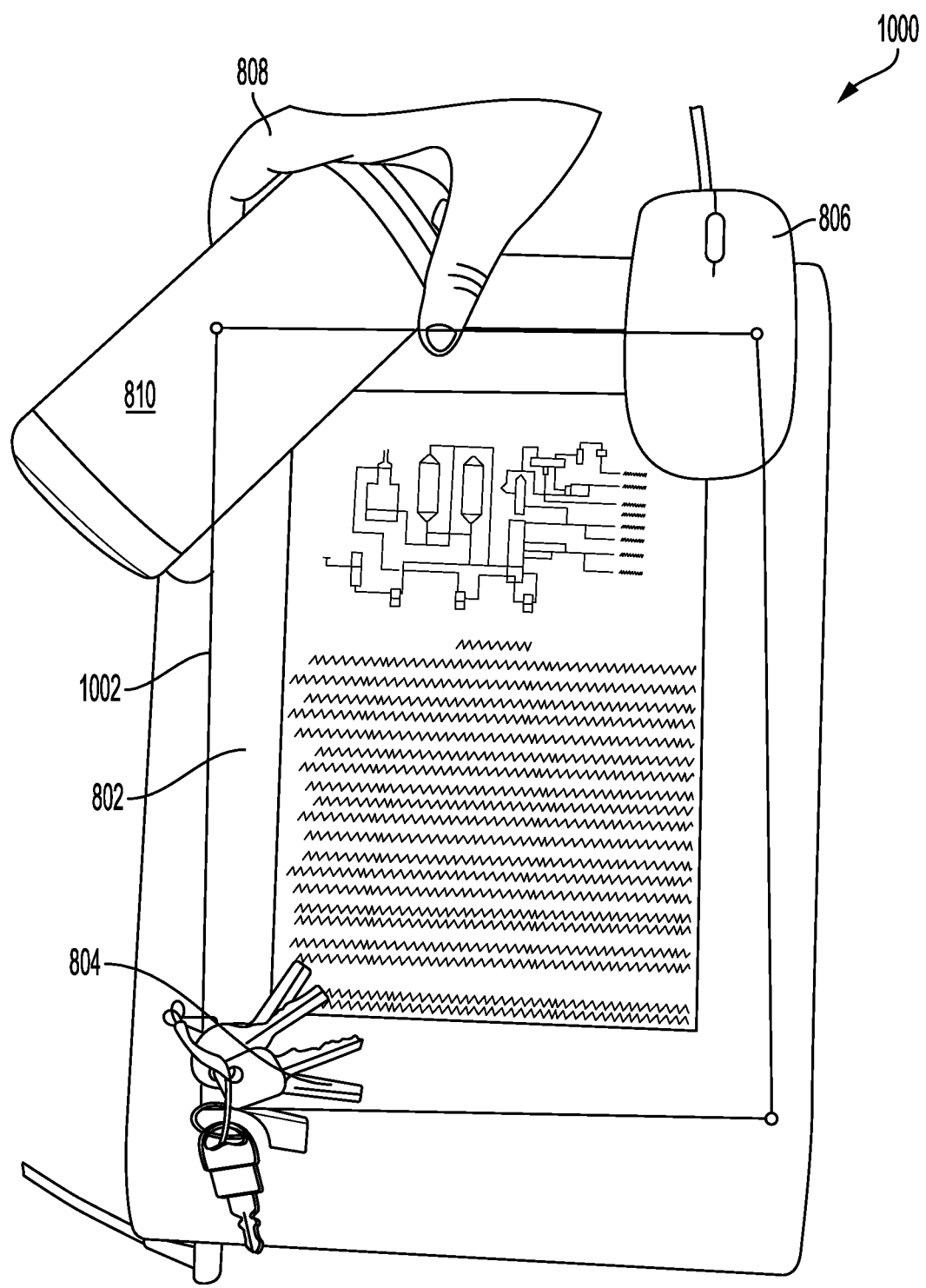

FIGS. 8-10 illustrate example, non-limiting polygon localization results that show how various examples described herein can increase polygon localization accuracy. As mentioned above, a non-limiting example of the deep learning pipeline 116 was reduced to practice to localize quadrilaterals (e.g., four-sided polygons) representing documents depicted in inputted images, and such example reduction to practice was pitted against various state-of-the-art quadrilateral localization systems. FIGS. 8-10 illustrate some results that were generated by such reduction to practice or by such state-of-the-art quadrilateral localization systems.

First, consider FIG. 8. As shown, FIG. 8 shows an image 800 that depicts/illustrates a document 802. As shown, the document 802 is partially occluded by various objects. Specifically, a bottom-left corner of the document 802 is partially occluded by car/door keys 804, a top-right corner of the document 802 is partially occluded by a computer mouse 806, and a top-left of the document 802 is partially occluded by a hand 808 and by a water bottle 810. In various aspects, such image was fed to a first state-of-the-art quadrilateral localization system, and such first state-of-the-art quadrilateral localization system produced as output localization lines 812. In various cases, the localization lines 812 can be considered as indicating where the first state-of-the-art quadrilateral localization system inferred the edges of the document 802 to be located. As shown, the localization lines 812 are highly inaccurate with respect to the top and left edges of the document 802. In other words, the partial occlusion of the document 802 prevented the first state-of-the-art quadrilateral localization system from accurately localizing the document 802.

Next, consider FIG. 9. As shown, FIG. 9 illustrates an image 900 of the document 802, as partially occluded by the car/door keys 804, the computer mouse 806, the hand 808, and the water bottle 810. In various instances, such image was fed to a second state-of-the-art quadrilateral localization system, and such second state-of-the-art quadrilateral localization system produced as output localization lines 902. Again, the localization lines 902 can be considered as indicating where the second state-of-the-art quadrilateral localization system inferred the edges of the document 802 to be located. As shown, the localization lines 902 are highly inaccurate with respect to the top edge of the document 802.

That is, the partial occlusion of the document 802 prevented the second state-of-the-art quadrilateral localization system from accurately localizing the document 802.

Now, consider FIG. 10. As shown, FIG. 10 illustrates an image 1000 of the document 802, as partially occluded by the car/door keys 804, the computer mouse 806, the hand 808, and the water bottle 810. In various instances, such image was fed to the example reduction to practice of the deep learning pipeline 116, and such example reduction to practice produced as output localization lines 1002 (e.g., the graphical user-interface component 602 rendered the localization lines 1002 to visually emphasize where the deep learning pipeline 116 inferred the edges of the document 802 to be located). As shown, the localization lines 1002 are highly accurate with respect to all edges of the document 802. That is, the partial occlusion of the document 802 did not prevent the example reduction to practice of the deep learning pipeline 116 from accurately localizing the document 802. Again, such results demonstrate that implementation of the circular-softmax block 316 as described herein can, in various aspects, cause an increase in polygon localization accuracy.

Figure 12:
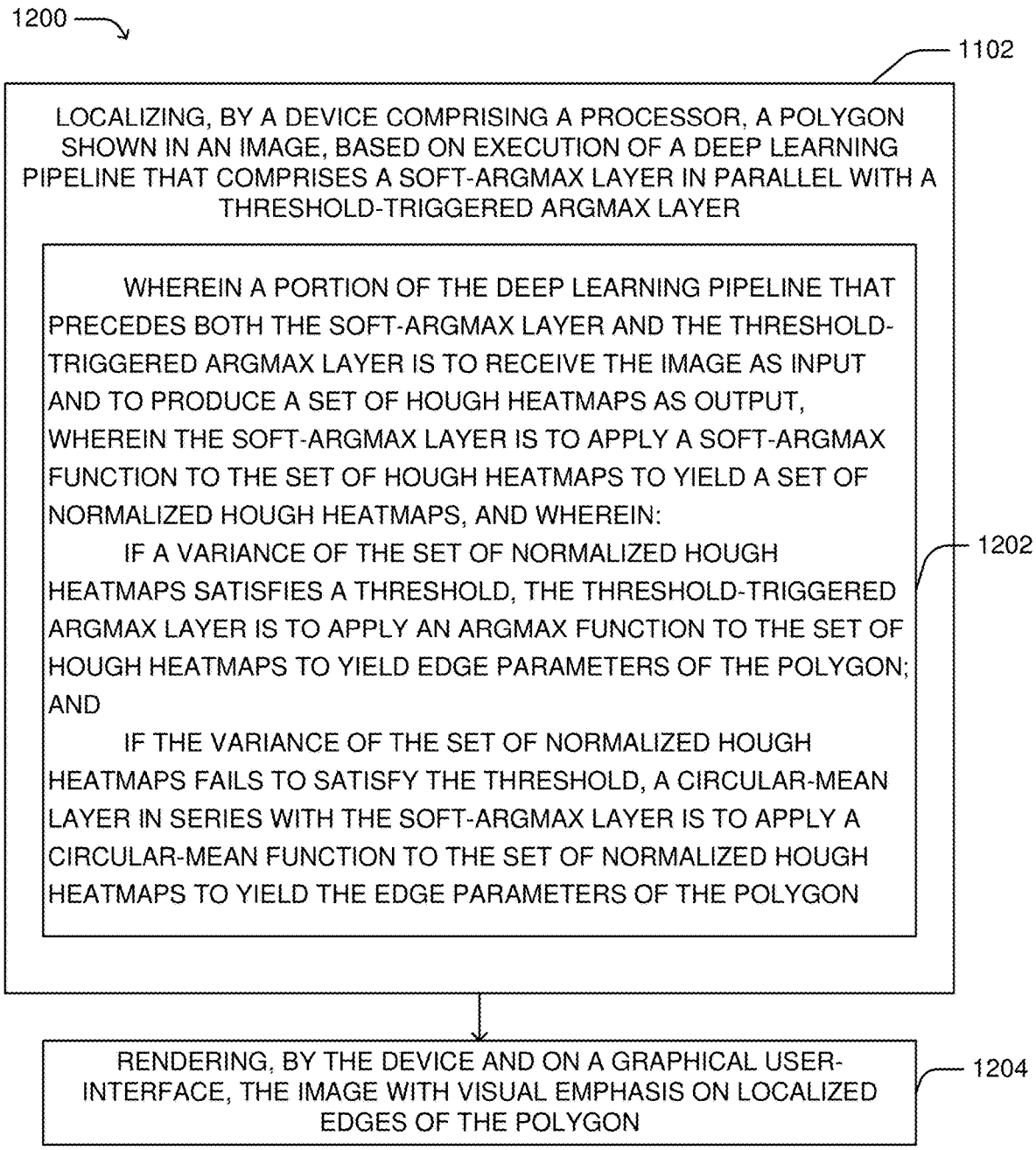

FIGS. 11-12 illustrate flow diagrams of example, non-limiting computer-implemented methods 1100-1200 that can facilitate polygon localization via a deep learning pipeline in accordance with various examples described herein. In various cases, the polygon localization system 102 can facilitate the computer-implemented method 1100 or 1200.

Consider the computer-implemented method 1100 shown in FIG. 11. In various aspects, act 1102 can include localizing, by a device (e.g., via 114) comprising a processor (e.g., 108), a polygon (e.g., 106) shown in an image (e.g., 104), based on execution of a deep learning pipeline (e.g., 116) that comprises a soft-argmax layer (e.g., 502) in parallel with a threshold-triggered argmax layer (e.g., 314).

Now, consider the computer-implemented method 1200 shown in FIG. 12. In various instances, as shown, the computer-implemented method 1200 can include act 1102 as described above.

In various aspects, and as denoted by a numeral 1202, non-limiting examples of act 1102 can include various of the following: a portion (e.g., 302, 306, and 310 collectively) of the deep learning pipeline that precedes both the soft-argmax layer and the threshold-triggered argmax layer can receive the image as input and can produce a set of Hough heatmaps (e.g., 312) as output; the soft-argmax layer can apply a soft-argmax function to the set of Hough heatmaps to yield a set of normalized Hough heatmaps (e.g., 504); if a variance of the set of normalized Hough heatmaps satisfies a threshold, the threshold-triggered argmax layer can apply an argmax function to the set of Hough heatmaps to yield edge parameters of the polygon (e.g., 202); and if the variance of the set of normalized Hough heatmaps fails to satisfy the threshold, a circular mean layer (e.g., 508) in series with the soft-argmax layer can apply a circular-mean function to the set of normalized Hough heatmaps to yield the edge parameters of the polygon.

In various instances, the computer-implemented method 1200 can further comprise act 1204, which can include rendering, by the device and on a graphical user-interface (e.g., via 602), the image with visual emphasis on localized edges of the polygon.

Figure 13:
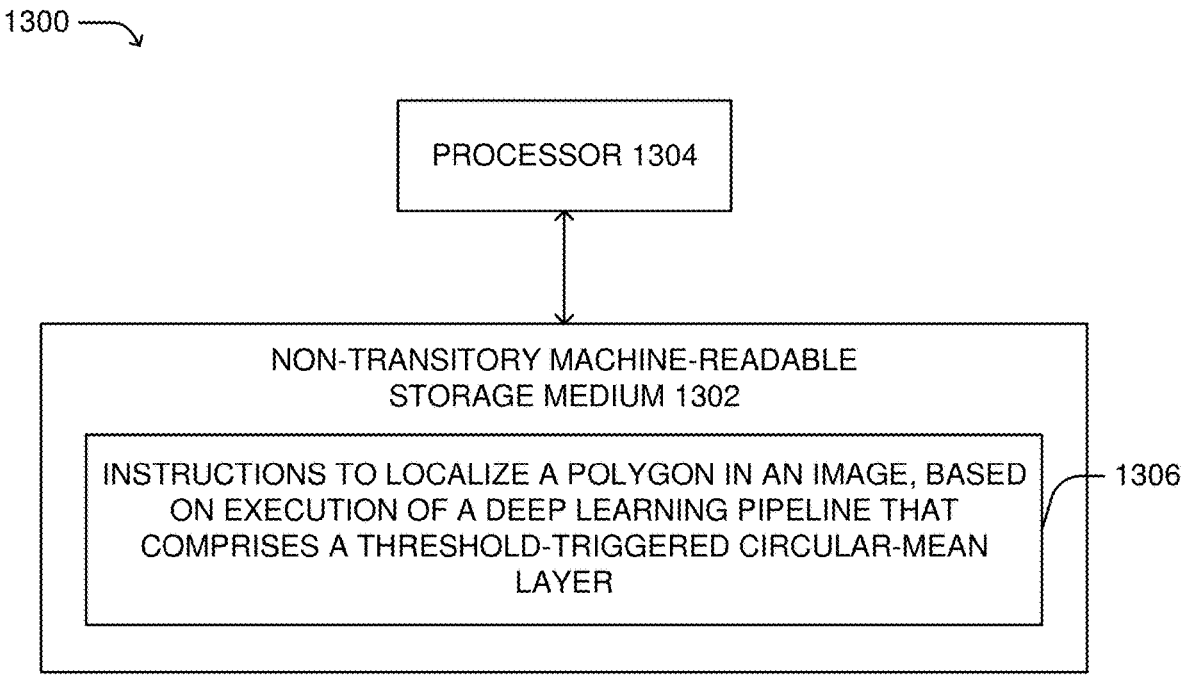
FIGS. 13-14 illustrate block diagrams of example, non-limiting non-transitory machine-readable storage media that can facilitate polygon localization via a deep learning pipeline in accordance with various examples described herein.
Figure 14:
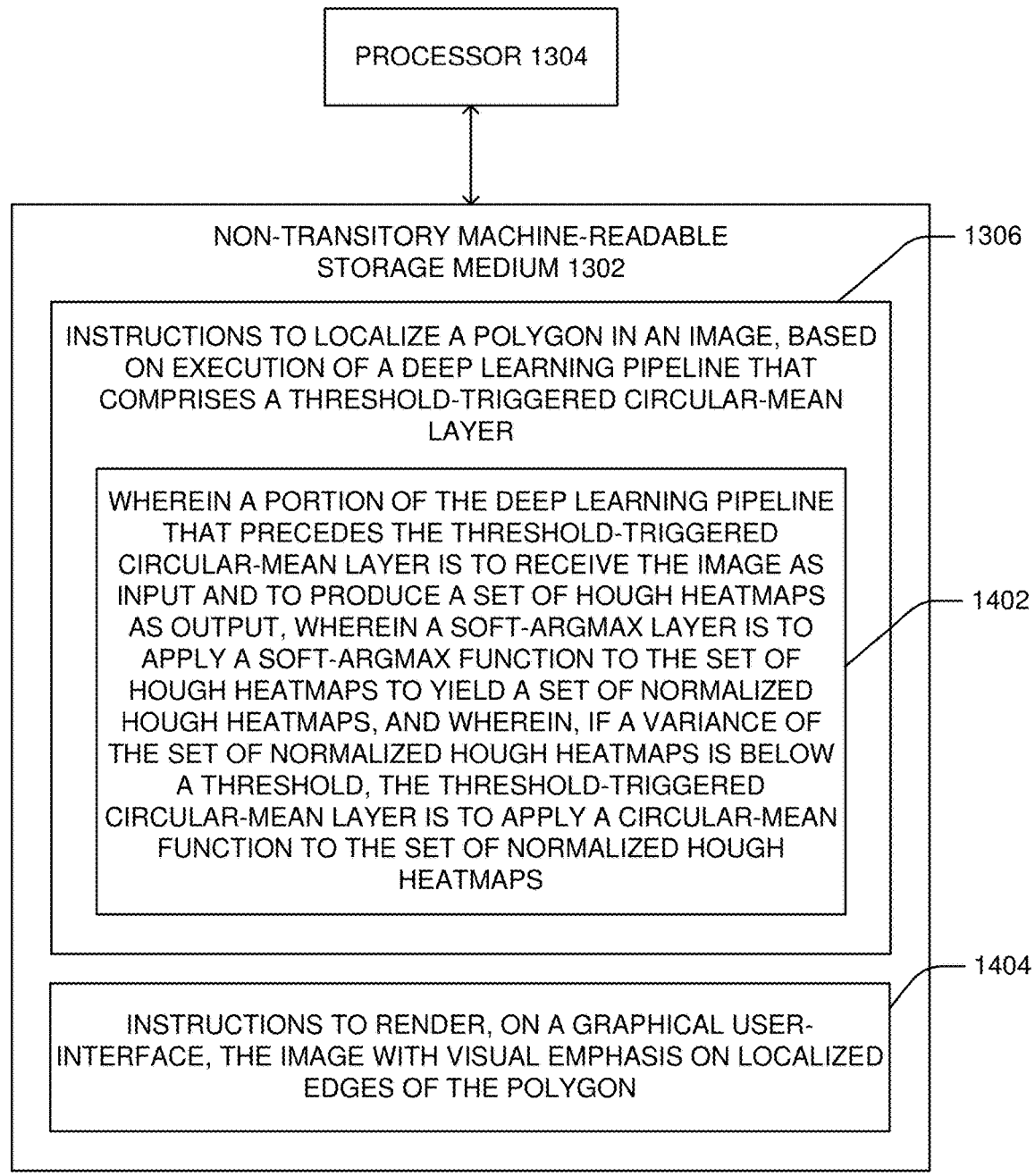

FIGS. 13-14 illustrate block diagrams 1300-1400 of example, non-limiting non-transitory machine-readable storage media that can facilitate polygon localization via a deep learning pipeline in accordance with various examples described herein.

First, consider the non-limiting block diagram 1300 of FIG. 13. As shown, there can be a non-transitory machine-readable storage medium 1302. In various aspects, the non-transitory machine-readable storage medium 1302 can include a single form of computer memory or multiple forms of computer memory. In various instances, the non-transitory machine-readable storage medium 1302 can be an electronic, magnetic, optical, or other physical storage device that stores executable non-transitory machine-readable storage media instructions. Thus, the non-transitory machine-readable storage medium 1302 may be, for example, RAM, an electrically-erasable programmable read-only memory ("EEPROM"), a storage drive, an optical disc, or the like. In various cases, the non-transitory machine-readable storage medium 1302 can be electronically integrated, via any suitable wired or wireless electronic connection, with a processor 1304. In various aspects, the non-transitory machine-readable storage medium 1302 can electronically store or maintain any suitable machine-readable instructions, or the processor 1304 can electronically execute or perform such machine-readable instructions.

In various aspects, the non-transitory machine-readable storage medium 1302 can comprise instructions 1306. In various instances, the instructions 1306 can be instructions to localize a polygon (e.g., 106) in an image (e.g., 104), based on execution of a deep learning pipeline (e.g., 116) that comprises a threshold-triggered circular-mean layer (e.g., 508).

Now, consider the non-limiting block diagram 1400 of FIG. 14. In various aspects, and as denoted by a numeral 1402, non-limiting examples of the instructions 1306 can include various of the following: a portion (e.g., 302, 306, and 310 collectively) of the deep learning pipeline that precedes the threshold-triggered circular-mean layer can receive the image as input and can produce a set of Hough heatmaps (e.g., 312) as output; a soft-argmax layer (e.g., 502) can apply a soft-argmax function to the set of Hough heatmaps to yield a set of normalized Hough heatmaps (e.g., 504); or, if a variance of the set of normalized Hough heatmaps is below a threshold, the threshold-triggered circular-mean layer can apply a circular-mean function to the set of normalized Hough heatmaps.

In various instances, the non-transitory machine-readable storage medium 1302 can further comprise instructions 1404, which can be instructions to render, on a graphical user-interface (e.g., via 602), the image with visual emphasis on localized edges of the polygon.

Accordingly, various examples described herein can be considered as a computerized tool that can execute, train, or otherwise implement a deep learning pipeline that comprises a circular-softmax block. As described herein, such non-limiting examples can cause the deep learning pipeline to more accurately localize polygons in inputted images, even if such polygons are partially occluded. Such non-limiting examples thus constitute useful and practical applications of computers.

Although the herein disclosure mainly describes various examples in which all of the set of Hough heatmaps 312 can be processed either by the argmax layer 314 or by the circular-softmax block 316, these are mere non-limiting examples. In various cases, some of the set of Hough heatmaps 312 can be processed by the argmax layer 314 (e.g., edge parameter tuples can be extracted from such Hough heatmaps via application of the argmax function), and others of the set of Hough heatmaps 312 can be processed by the circular-softmax block 316 (e.g., edge parameter tuples can be extracted from such other Hough heatmaps via application of the soft-argmax function and the circular-mean function). In particular, for any given Hough heatmap in the set of Hough heatmaps 312, the circular-softmax block 316 can process that given Hough heatmap if a variance of that given Hough heatmap is below a threshold value. In contrast, if a variance of that given Hough heatmap is above the threshold value, then that given Hough heatmap can be processed by the argmax layer 314. Accordingly, in various examples, some of the set of edge parameter tuples 202 can be obtained via the argmax layer 314, while others of the set of edge parameter tuples 202 can be obtained via the circular-softmax block 316.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

While various examples are described herein in the general context of non-transitory machine-readable storage media instructions that can run on computers, such examples can be implemented in combination with other program components or as a combination of hardware and non-transitory machine-readable storage media instructions. Generally, program components can include routines, programs, modules, data structures, or the like, that can perform particular tasks or that can implement particular abstract data types.

Various examples described herein can be practiced in distributed computing environments where any suitable tasks can be performed by remote processing devices linked through any suitable communications network. In a distributed computing environment, program components can be located in local or remote memory storage devices.

Various teachings described herein include mere non-limiting examples of apparatuses, computing devices, computer program products, or computer-implemented methods. It is, of course, not possible to describe every conceivable combination of components, products, devices, apparatuses, or computer-implemented methods for purposes of describing this disclosure. However, in view of the herein teachings, various further combinations or permutations of this disclosure are possible.

To the extent that the terms "includes," "has," "possesses," and the like are used in the detailed description, claims, appendices, or drawings, such terms are intended to be inclusive in a manner similar to the term "comprising" as "comprising" is interpreted when employed as a transitional word in a claim. The descriptions of the various examples have been presented for purposes of illustration, and such descriptions are not intended to be exhaustive or limited to the examples disclosed. Many modifications or variations can be implemented without departing from the scope and spirit of the described examples.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used herein and annexed drawings should generally be construed to mean "one or more" unless specified otherwise or clear from context to be directed to a singular form. As used herein, the term "example" is utilized to mean serving as an example, instance, or illustration. For the avoidance of doubt, the subject matter disclosed herein is not limited by such examples.

What is claimed is:

1. A device, comprising:
   a processor; and
   a non-transitory computer readable memory with machine-readable instructions stored thereon, the machine-readable instructions executable to cause the processor to:
   localize a polygon depicted in an image, based on execution of a deep learning pipeline that comprises a circular-softmax block, wherein a portion of the deep learning pipeline that precedes the circular-softmax block is to receive the image as input and to produce a set of Hough heatmaps as output.

2. The device of claim 1, wherein the machine-readable instructions are executable to cause the processor to:
   render, on a graphical user-interface, the image with visual emphasis on localized edges of the polygon.

3. The device of claim 1, wherein the circular-softmax block comprises a soft-argmax layer and a circular-mean layer, wherein the soft-argmax layer is to apply a soft-argmax function to the set of Hough heatmaps to yield a set of normalized Hough heatmaps, and wherein the circular-mean layer is to apply a circular-mean function to the set of normalized Hough heatmaps to yield edge parameters of the polygon.

4. The device of claim 1, wherein the deep learning pipeline comprises an argmax layer that is in parallel with the circular-softmax block, and wherein:
   the circular-softmax block is to apply a soft-argmax function to the set of Hough heatmaps to yield a set of normalized Hough heatmaps;
   if a variance of the set of normalized Hough heatmaps is above a threshold, the argmax layer is to apply an argmax function to the set of Hough heatmaps to yield edge parameters of the polygon; and
   if the variance of the set of normalized Hough heatmaps is below the threshold, the circular-softmax block is to apply a circular-mean function to the set of normalized Hough heatmaps to yield the edge parameters of the polygon.

5. The device of claim 1, wherein the deep learning pipeline comprises a backbone network and a Hough layer, wherein the backbone network is to receive the image as input and to produce a set of Cartesian-space features as output, and wherein the Hough layer is to apply a Hough Transform to the set of Cartesian-space features to yield a set of Hough-space features.

6. The device of claim 5, wherein the deep learning pipeline comprises a heatmap block, wherein the heatmap block is to receive as input the set of Hough-space features and to produce as output a set of Hough heatmaps, and wherein the heatmap block comprises a padding layer and a plurality of convolutional layers.

7. The device of claim 6, wherein the padding layer is to apply zero-padding to left and right sides of the set of Hough-space features, and wherein the padding layer is to apply circular-padding to top and bottom sides of the set of Hough-space features.

8. A method, comprising:

localizing, by a device comprising a processor, a polygon shown in an image, based on execution of a deep learning pipeline that comprises a soft-argmax layer in parallel with a threshold-triggered argmax layer wherein a portion of the deep learning pipeline that precedes both the soft argmax layer and the threshold-triggered argmax layer is to receive the image as input and to produce a set of Hough heatmaps to yield a set of normalized Hough heatmaps.

9. The method of claim 8, comprising:

rendering, by the device and on a graphical user-interface, the image with visual emphasis on localized edges of the polygon.

10. The method of claim 8, if a variance of the set of normalized Hough heatmaps satisfies a threshold, the threshold-triggered argmax layer is to apply an argmax function to the set of Hough heatmaps to yield edge parameters of the polygon; and if the variance of the set of normalized Hough heatmaps fails to satisfy the threshold, a circular mean layer in series with the soft-argmax layer is to apply a circular-mean function to the set of normalized Hough heatmaps to yield the edge parameters of the polygon.

11. The method of claim 10, wherein the portion of the deep learning pipeline that precedes both the soft-argmax layer and the threshold-triggered argmax layer generates the set of Hough heatmaps based on zero-padding and circular-padding.

12. A non-transitory machine-readable storage medium encoded with instructions executable by a processor, the non-transitory machine-readable storage medium comprising:

instructions to localize a polygon in an image, based on execution of a deep learning pipeline that comprises a threshold-triggered circular-mean layer.

13. The non-transitory machine-readable storage medium of claim 12, comprising:

instructions to render, on a graphical user-interface, the image with visual emphasis on localized edges of the polygon.

14. The non-transitory machine-readable storage medium of claim 12, wherein a portion of the deep learning pipeline that precedes the threshold-triggered circular-mean layer is to receive the image as input and to produce a set of Hough heatmaps as output, wherein a soft-argmax layer is to apply a soft-argmax function to the set of Hough heatmaps to yield a set of normalized Hough heatmaps, and wherein, if a variance of the set of normalized Hough heatmaps is below a threshold, the threshold-triggered circular-mean layer is to apply a circular-mean function to the set of normalized Hough heatmaps.

* * * * *